(12) United States Patent
Goldman et al.

(10) Patent No.: US 8,443,277 B2
(45) Date of Patent: May 14, 2013

(54) DIGITAL CONTENT ENHANCEMENT PLATFORM

(75) Inventors: Richard Goldman, Cedarburg, WI (US); Christopher Stephenson, Medfield, MA (US); Robert A. Bailie, Mequon, WI (US)

(73) Assignee: SpanLocal News, Inc., Medfield, MA (US)

( * ) Notice: Subject to any disclaimer, the term of this patent is extended or adjusted under 35 U.S.C. 154(b) by 69 days.

(21) Appl. No.: 13/159,145

(22) Filed: Jun. 13, 2011

(65) Prior Publication Data

US 2012/0317476 A1 Dec. 13, 2012

(51) Int. Cl.
*G06F 17/00* (2006.01)

(52) U.S. Cl.
USPC ............ 715/206; 715/205; 715/207; 715/208

(58) Field of Classification Search .................. 715/205, 715/206, 207, 208
See application file for complete search history.

(56) References Cited

U.S. PATENT DOCUMENTS

| | | | |
|---|---|---|---|
| 6,011,537 A | 1/2000 | Slotznick | |
| 6,035,308 A * | 3/2000 | Yano et al. | 715/201 |
| 6,211,874 B1 | 4/2001 | Himmel et al. | |
| 6,430,563 B1 * | 8/2002 | Fritz et al. | 707/694 |
| 6,535,912 B1 * | 3/2003 | Anupam et al. | 709/217 |
| 7,058,695 B2 * | 6/2006 | Takagi et al. | 709/217 |
| 7,908,284 B1 | 3/2011 | Mathes et al. | |
| 7,962,522 B2 * | 6/2011 | Norris, III | 707/792 |
| 7,962,843 B2 * | 6/2011 | Milic-Frayling et al. | 715/206 |
| 8,225,195 B1 * | 7/2012 | Bryar et al. | 715/206 |
| 2001/0038395 A1 | 11/2001 | Holtzblatt | |
| 2004/0093232 A1 | 5/2004 | Murray | |
| 2005/0010865 A1 | 1/2005 | Kuppusamy | |
| 2005/0108160 A1 | 5/2005 | Vishik | |
| 2005/0172231 A1 | 8/2005 | Myers | |
| 2006/0070012 A1 | 3/2006 | Milener | |
| 2006/0112125 A1 * | 5/2006 | Potok et al. | 707/101 |
| 2006/0230333 A1 | 10/2006 | Racovolis | |

(Continued)

FOREIGN PATENT DOCUMENTS

EP 1486861 A2 12/2004

OTHER PUBLICATIONS

"iGlue: Add an Informative Layer on Every Webpage to View Useful Structured Information," 5 pages, retrieved Aug. 10, 2012, Available at: http://maketecheasier.com/use-iglue-view-useful-info/2011/07/12.

(Continued)

*Primary Examiner* — Stephen Hong
*Assistant Examiner* — Matthew Ludwig
(74) *Attorney, Agent, or Firm* — Robert Plotkin, P.C.

(57) ABSTRACT

A computer-based system provides a user interface for displaying hyperlinked content (such as web content) and for enabling users to navigate the hyperlinks contained within such content. One benefit of various embodiments of the present invention is that they enable primary hyperlinked content to be rendered, and for associated content (i.e., content located at the destinations of hyperlinks within the primary content) to be rendered without replacing, overwriting, or otherwise obscuring the rendering of the primary content. As a result, the rendering of the primary content remains fully visible after the associated content is rendered and while the rendering of the associated content is visible. For example, the associated content may be rendered in an existing display area that does not overlap with the display area containing the rendering of the primary content.

4 Claims, 16 Drawing Sheets

U.S. PATENT DOCUMENTS

| | | | |
|---|---|---|---|
| 2008/0137668 A1* | 6/2008 | Rodriguez et al. | 370/400 |
| 2010/0299322 A1* | 11/2010 | Zhang | 707/722 |
| 2012/0311470 A1* | 12/2012 | Roberts et al. | 715/763 |

OTHER PUBLICATIONS

Steve O'Hear, "iGlue, which wants to wikify the Web, launches its semantic content organizer," Nov. 15, 2010, 2 pages, retrieved Aug. 10, 2012, Available at: http://techcrunch.com/2010/11/15/iglue-which-wants-to-wikify-the-web-l...

Martin, Bryant, "iGlue makes any Web page more useful, with rich annotations," Jun. 23, 2011, 4 pages, retrieved Aug. 10, 2012, Available at: http://thenextweb.com/apps/2011/06/23/iglue-makes-any-web-page-more-...

Angelo Di Iorio et al, "Beyond Proxies: XLink Support in the Browser," Proceedings of ITA. 05, Wrexham, North Wales (UK), 2005.

Maria G. Pimentel and John Buford, "Non-Invasive Improvements to Hyperlinking with HTML," Webnet (1996).

* cited by examiner

DIGITAL CONTENT ENHANCEMENT PLATFORM

BACKGROUND

The World Wide Web and other Internet-based applications have begun to replace print-based publications for many readers and for many kinds of content. For example, the contents of most major newspapers are now available through web sites and iPad apps. The same is true for many magazines and other periodicals that were once available only in print form.

Significant effort has been directed to making such online content easy to read and navigate. For example, news web sites typically provide a home page that lists the headlines and summaries of current articles, much like the cover page of a traditional print newspaper. The headlines of such articles contain hyperlinks to the bodies of the articles, so that users can navigate to the beginning of an article by clicking on its headline. Users can then scroll vertically through the article using a scrollbar and/or cursor navigation keys, and browse from page to page by clicking on "next page" and "previous page" buttons. The author of a particular news article may mark up the article's text with hyperlinks to related content on the same web site or other web sites, thereby allowing the user to navigate to such related content by clicking on the hyperlinks. Advertisements may be displayed in connection with the article content, such as in the form of banner advertisements displayed alongside the article content or pop-up advertisements that appear in new windows displayed on top of the article content.

These conventional techniques for displaying web site content and for enabling users to navigate through such content have a variety of drawbacks. For example, as mentioned above, pop-up advertisements typically appear on top of and thereby obscure the main article content. If such advertisements are displayed automatically (e.g., even if the user does not click on a link or otherwise affirmatively request that the advertisement be displayed), then the advertisement may interrupt the user's experience of reading the main article content. To return to reading the main article, the user must then move or close the pop-up window. Users who become frustrated with this experience may eventually disable pop-up ads from being displayed permanently. This may be disadvantageous not only to the advertiser and the web site owner by decreasing their advertising revenue, but also to the user, who may wish to see relevant advertisements but in a less obtrusive way.

A related disadvantage of conventional techniques for displaying web site content and for enabling users to navigate through such content is that they can make it difficult for users to engage in the kind of nonlinear exploration of content for which the Web and hypertext were designed. For example, if a user clicks on a hyperlink within a news article, the destination (target) of the hyperlink typically is displayed by refreshing the current web page to contain the destination content, or by opening the destination content in a new tab or a new window. In any of these cases, it can be difficult, tedious, and time-consuming for the user to return to the point in the original article that contains the hyperlink. For example, if clicking on the hyperlink caused the current web browser window to be refreshed so that the original article was replaced with the destination content, returning to the original article typically requires clicking on the browser's "back" button or clicking on a "return to article" link. If the user has followed several additional links after clicking on the original link, the user may need to click on the "back" button several times or otherwise engage in several actions. Sometimes such efforts to return to the original article content fail, thereby requiring the user to re-enter the URL of the original article content or otherwise engage in other manual effort to return to the original article. These and other problems are frustrating to the user, because they make it difficult for the user to navigate through hyperlinked content, and are undesirable from the point of view of the original web site owner, because they increase the likelihood that a user who leaves the original web site by clicking on a hyperlink will not subsequently return to the web site.

For these and other reasons, there is a need for improved techniques for rendering hyperlinked content and for enabling users to navigate such content.

SUMMARY

A computer-based system provides a user interface for displaying hyperlinked content (such as web content) and for enabling users to navigate the hyperlinks contained within such content. One benefit of various embodiments of the present invention is that they enable primary hyperlinked content to be rendered, and for associated content (i.e., content located at the destinations of hyperlinks within the primary content) to be rendered without replacing, overwriting, or otherwise obscuring the rendering of the primary content. As a result, the rendering of the primary content remains fully visible after the associated content is rendered and while the rendering of the associated content is visible. For example, the associated content may be rendered in an existing display area that does not overlap with the display area containing the rendering of the primary content.

The primary content may previously have been extracted from another source. For example, a first web page may contain a news article containing or consisting of the primary content. When the first web page is displayed, the news article may be displayed in addition to various other content, such as advertisements, a masthead, and navigational tools such as buttons and hyperlinks. Only the article content, such as the headline, byline, and article (hyper)text may be extracted from the first web page as the primary content. This extracted primary content may then be made available for viewing and browsing using the enhanced user interface described above.

The extracted primary content may be enhanced before it is made available for viewing and browsing using the enhanced user interface. For example, the primary content may or may not contain hyperlinks within the first (original) web page. While or after extracting the primary content from the first web page, however, existing hyperlinks within the primary content may be modified and/or new hyperlinks may be added. In particular, hyperlinks having multiple destinations ("multi-destination links") may be added. A multi-destination link has a single source (anchor) but two or more destinations. Each link destination may be associated with one or more types, referred to herein as "facets." For example, consider a multi-destination link in which the anchor is the term "tennis," having as a first destination an encyclopedia entry for the word "tennis" and having as a second destination an advertisement for a tennis equipment retailer. In this example, the first destination may be associated with the facet "encyclopedia" and the second destination may be associated with the facet "advertisement." Different multi-destination links may have different numbers of destinations, and may have destinations associated with different facets than each other.

Once primary content has been marked up with multi-destination links, embodiments of the present invention enable the resulting marked-up primary content to be displayed and navigated in a variety of ways. For example, the enhanced user interface may:

- display the primary content within a display area that is never obstructed by other content, such as content at the destinations of hyperlinks within the primary content;
- navigate through the extracted article without vertical scrolling, such as by clicking on numbered buttons near the article content to flip from one page to another, or by scrolling horizontally through the article by one or more columns at a time;
- display content at the destinations of hyperlinks within the primary content, upon clicking or hovering over hyperlinked terms, in a frame or other display area that is separate from and non-overlapping with the primary article content display area;
- enable the user to select a particular facet (e.g., "encyclopedia" or "advertisements") and then select a multi-destination link within the primary content to cause the particular destination associated with the selected facet within the multi-destination link to be rendered; and
- perform all of the operations listed above without refreshing the web page or other display area within which the primary content is rendered, without opening a new tab or window, and without replacing, overwriting, or otherwise obscuring the primary content.

For example, one embodiment of the present invention is directed to a method for use with primary content, wherein the primary content includes a first term, wherein the first term is associated with a first plurality of associated contents, wherein the first plurality of associated contents includes first associated content and second associated content. The method comprises: (1) rendering at least part of the primary content to create a rendering of the at least part of the primary content, including rendering the first term to create a rendering of the first term; (2) rendering the first associated content to create a rendering of the first associated content in a first existing display area wherein the rendering of the at least part of the primary content remains fully visible after the first associated content is rendered; and (3) rendering the second associated content to create a rendering of the second associated content in a second existing display area, wherein the rendering of the at least part of the primary content remains fully visible after the first associated content is rendered.

Another embodiment of the present invention is directed to a method for use with primary content. The primary content includes: (A) a first term, wherein the first term is associated with first associated content and second associated content, wherein the first associated content is associated with a first facet, and wherein the second associated content is associated with a second facet; and (B) a second term, wherein the second term is associated with third associated content and fourth associated content, wherein the third associated content is associated with the first facet, and wherein the second associated facet is associated with a third facet. The method comprises: (1) rendering at least part of the primary content to create a rendering of the at least part of the primary content, including rendering the first term to create a rendering of the first term and rendering the second term to create a rendering of the second term; (2) receiving first user input selecting the first facet; (3) receiving second user input selecting the first term; (4) in response to receiving the second user input, rendering the first associated content to create a rendering of the first associated content in a first existing display area, wherein the rendering of the at least part of the primary content remains fully visible after the first associated content is rendered; (5) receiving third user input selecting the second term; and (6) in response to receiving the third user input and without receiving additional input selecting the first facet, rendering the third associated content to create a rendering of the third associated content in the first existing display area, wherein the rendering of the at least part of the primary content remains fully visible after the third associated content is rendered.

Other features and advantages of various aspects and embodiments of the present invention will become apparent from the following description and from the claims.

DETAILED DESCRIPTION

Figure 1A:
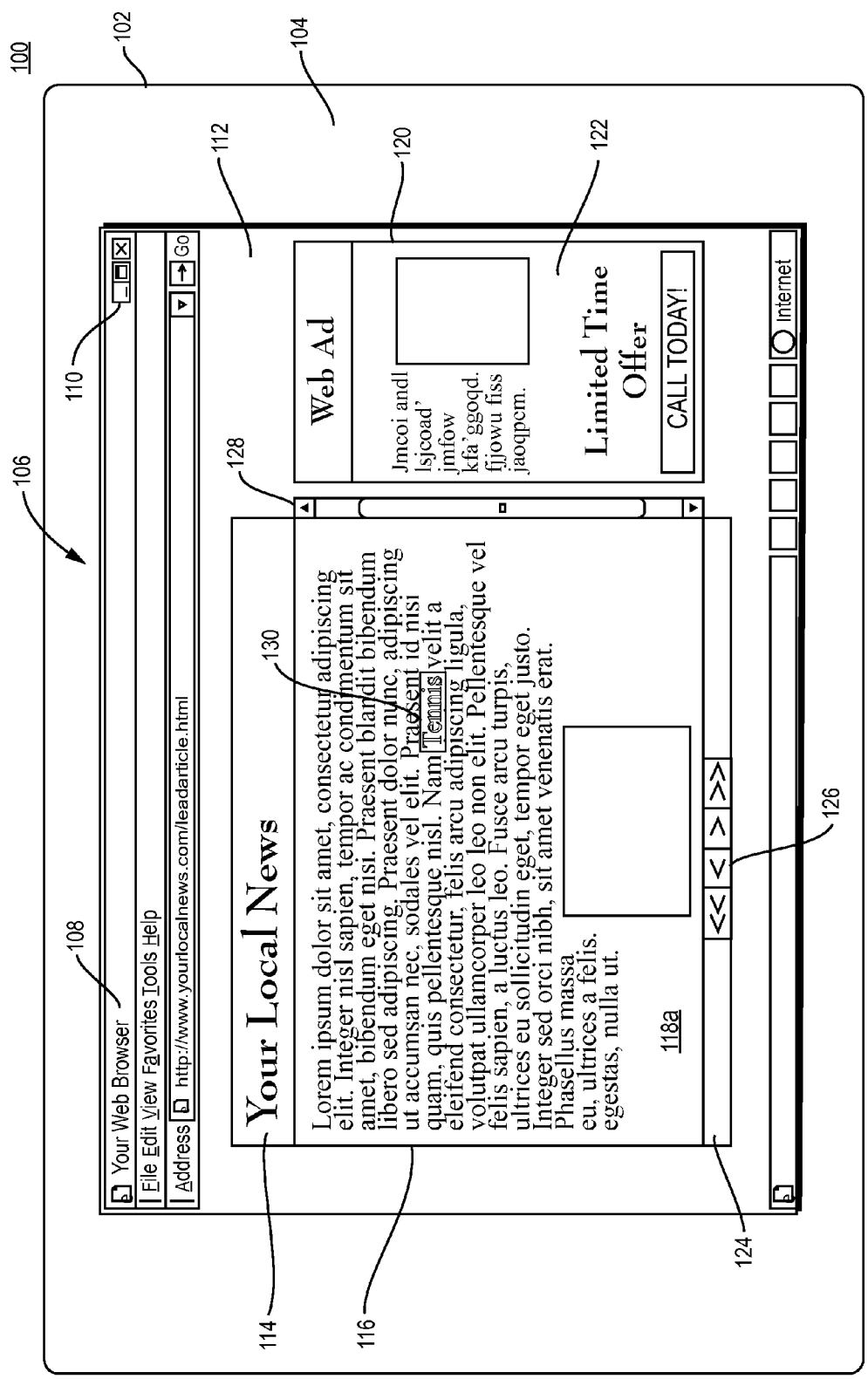
FIGS. 1A-1E are diagrams of prior art computing devices for rendering hypertext documents.

Referring to FIG. 1A, a diagram is shown of a computing device 100 that uses a prior art user interface to display hypertext content. For example, the interface is typical of the kind used by conventional web browsers. The computing device 100 contains a monitor 102 for displaying visual output. The monitor 102 includes a physical display area 104, which is the complete display area on which the monitor 102 is physically capable of displaying output. For example, if the computing device 100 runs an operating system based on the desktop metaphor, the operating system may display the desktop on the full monitor display area 104, but display windows of particular applications within a subset of the monitor display area 104.

For example, FIG. 1A shows a window 106 of a particular application, which may, for example, be a web browser or other application for displaying hypertext content. The application window 106 occupies less than all of the monitor display area 104. Alternatively, however, the application window 106 may be displayed in a "full screen" mode in which the application window 106 occupies the full monitor display area 104, and in which the application window 106 is therefore coextensive with the monitor display area 104. The application window 106 may be switchable between normal (non-full screen) and full screen mode in response to user input. Some applications may display by default and/or only in full screen mode, while other applications may display by default and/or only in normal (non-full screen) mode. Many other variations exist and are well-known to those having ordinary skill in the art.

The application window 106 may contain an application display area 112 for displaying application content. The application display area 112 may occupy a subset of the monitor display area 104. If, for example, the application window 106 belongs to a web browser, then the application display area 112 may display renderings of web pages. The application window 106 may also contain various user interface elements, such as a menu 108 and window controls 110, that are within the application window 106 but outside of the application display area 112. The particular user interface elements 108 and 110 shown in FIG. 1A are merely representative examples. Many other examples of user interface elements falling outside the application display area 112 are well-known to those having ordinary skill in the art. Furthermore, the application window 106 need not include any such user interface elements, in which case the application display area 112 may be occupy and be coextensive with the entire application window 106.

Hypertext content, such as web pages, may be laid out in any of a variety of ways and contain any of a variety of content. However, for purposes of example, FIG. 1A shows a particular layout that is common to web pages designed to display news content. In particular, the layout shown in FIG. 1A includes a masthead 114, which may, for example, contain the name of the newspaper (e.g., "The New York Times" or "The San Jose Mercury News"). The masthead 114 may be hyperlinked to the home web of the newspaper's web site.

Figure 1B:
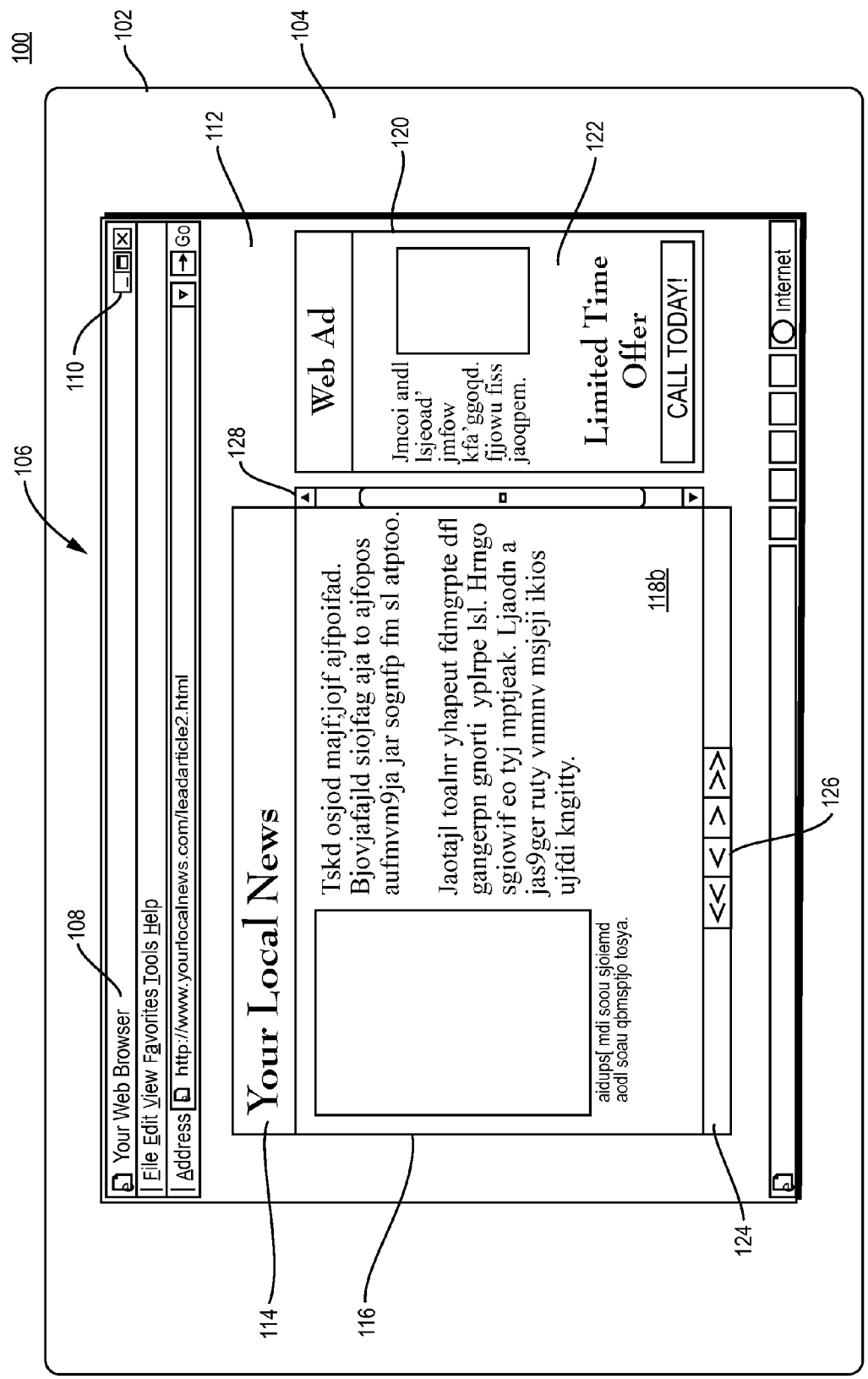
Figure 1C:
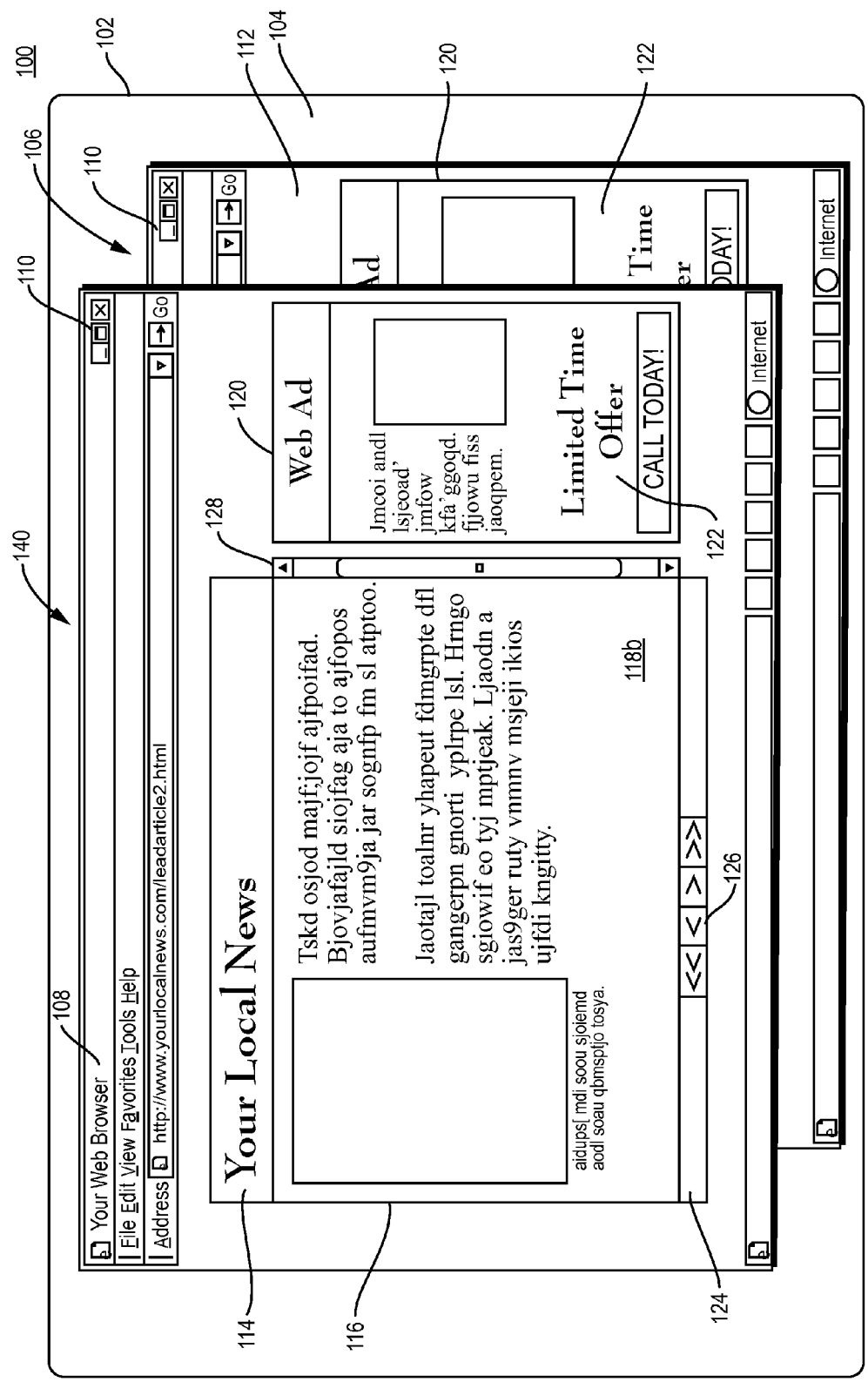

The web page layout shown in FIG. 1A also contains a primary content display area 116 for displaying a rendering 118a of primary content, such as the text of a news article. For example, referring to FIG. 1F, an illustration is shown of web content 150a, such as an HTML document, that contains various content that may be rendered within the application display area 112 of FIG. 1A. FIG. 1F shows just a few examples of content that may be rendered within the application display area 112, but those having ordinary skill in the art will understand that the web content 150a may contain other content that is necessary or useful for creating the rendering shown in FIG. 1A. For example, the web content 150a may contain masthead content 154 for creating the masthead rendering 114 in FIG. 1A, and primary content 158a for creating the primary content rendering 118a in FIG. 1A.

The primary content display area 116, as shown in FIG. 1A, may occupy a subset of the application display area 112, or may be coextensive with the application display area 112. The primary content rendering 118a may, for example, represent the entire news article (e.g., the entire primary content 158a in FIG. 1F) or only a portion thereof. For example, upon clicking on the headline of the article on the newspaper's home page, the newspaper web site may display the first few paragraphs of the article as the primary content rendering 118a within the primary content area 116. To view the remainder of the article, the user may be required to scroll vertically through the rendering of the primary content 158a (such as by using cursor navigation keys or a vertical scrollbar 128) or to navigate to subsequent pages of the primary content 158a by clicking on navigation tools 126 (e.g., "next page" and "previous page" links) within a navigation tools area 124. (Navigation tools 126 may be renderings of navigation tool content 166 within the web content 150a in FIG. 1F.)

The layout shown in FIG. 1A also contains an advertisement area 120 for displaying renderings 122 of advertising content 168. Although the advertisement renderings 122 in FIG. 1A are shown as banner advertisements, this is merely an example. Various other kinds of advertisements are well-known to those having ordinary skill in the art.

The advertisement to be displayed as the advertisement rendering 122 may, for example, be hard-coded into the advertising content 168 in the web page 150a (FIG. 1F), or may be dynamically generated, such as by an advertisement server (not shown). One kind of dynamically-generated advertisement is a contextual advertisement, which is selected dynamically at the time of rendering the web page 150a based on factors such as the content of the primary content 158a and/or demographic characteristics of the user. However the advertisements 122 are selected, the placement of the advertisements 122 (e.g., the size and location of the advertisement area 120) and the process for selecting the advertisements 122 is determined by the designer of the web page 150a and is encoded into the web page 150a itself.

The primary content 158a may contain one or more hyperlinks, which may be rendered within the primary content rendering 118a in any of a variety of ways. For example, in FIG. 1F, primary content 158a contains hypertext 160, which is rendered in FIG. 1A as hyperlinked text 130. The hypertext 160 may, for example, be defined by underlying HTML code, such as an anchor tag, that specifies: (1) the particular text to serve as the hyperlink's source (anchor) 162, and (2) a location or other identifier 164 of the destination (target) of the hyperlink. In response to the user clicking on or otherwise selecting the hyperlinked text rendering 130 in the primary content area 116, the application navigates to the content 170 identified by the destination (target) 164 of the hyperlink 160.

Such navigation to the target content 170 pointed to be the hyperlink 160 may be executed in a variety of ways. For example, to navigate to the target content 170 of the hyperlink 160 the application may "refresh" the primary content area 116 with a rendering of the hyperlink's target content 170. Refreshing involves completely replacing the rendering 118a of the original primary content 158a with a rendering of the target content 170, such as by erasing the rendering 118a of the original primary content 158a (e.g., erasing the entire contents of the primary content area 116) and rendering the target content 170 in its place (e.g., within the primary content area 116). This approach is shown in FIG. 1B, in which the rendering 118a of primary content 158a has been replaced with a rendering 118b of target content 170, which is the destination of the hypertext 160. More generally, such refreshing may involve refreshing not only the primary content area 116 but also the entire application display area 112, including elements such as the masthead 114, advertisements 122, and navigation tools 124.

As is clear from this description, as a result of the process of refreshing the application display area 112 to navigate to the destination 170 of hypertext 160, the original primary content rendering 118a is no longer visible on the monitor 102. To re-display the rendering 118a of the original primary content 158a, the user must take a step such as activating one of the navigation tools 126 in the navigation area 124, clicking on a "back" button, or re-entering the URL of the web page 150a containing the primary content 158a.

As another example of navigation to the target of a hyperlink, the application may open a new window and render the target content in the new window. For example, as shown in FIG. 1C, navigating to the target content 170 pointed to by the target 164 of hypertext 160 may cause the application to open a new window 140 and to render the target content 170 within the window 140 as primary content 118b. The window 140 is "new" in the sense that it was not open before the user selected the hypertext 130 and before the primary content rendering 118b was rendered into the window 140. In the example shown in FIG. 1C, the new window 140 overlaps and partially obscures (obstructs) the original primary content rendering 118a. Alternatively, for example, the new window 140 may be located fully outside the boundaries of the primary content area 116. The new window 140 may be located partially or fully within the application display area 112, or fully outside the application display area 112.

To remove the rendering 118b of the destination content 170, the user must manually close the new window 140. If the new window partially or fully obstructs the original content rendering 118*a*, then to re-view the original content rendering 118*a*, the user must manually move or close the new window 140.

Figure 1D:
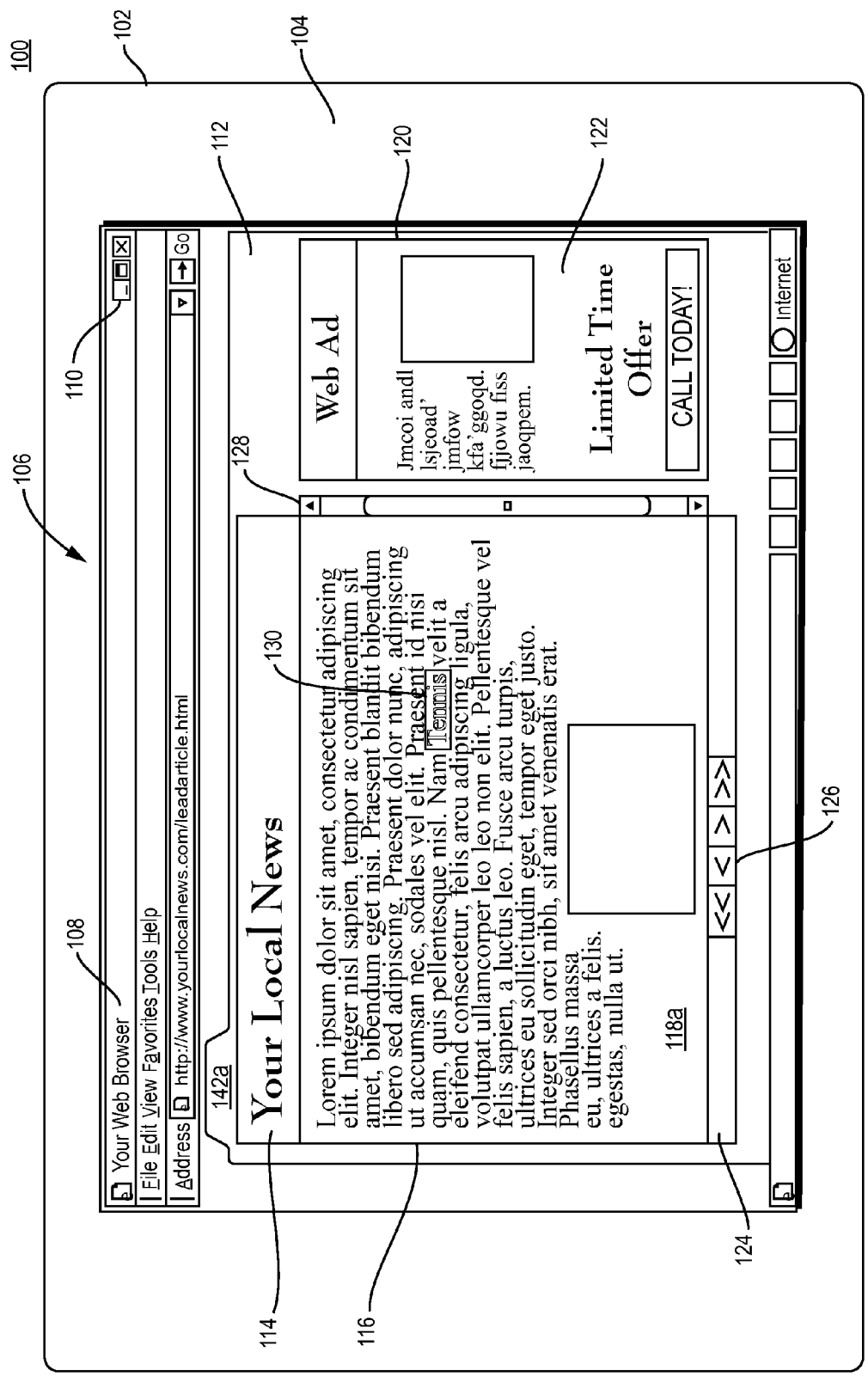
Figure 1E:
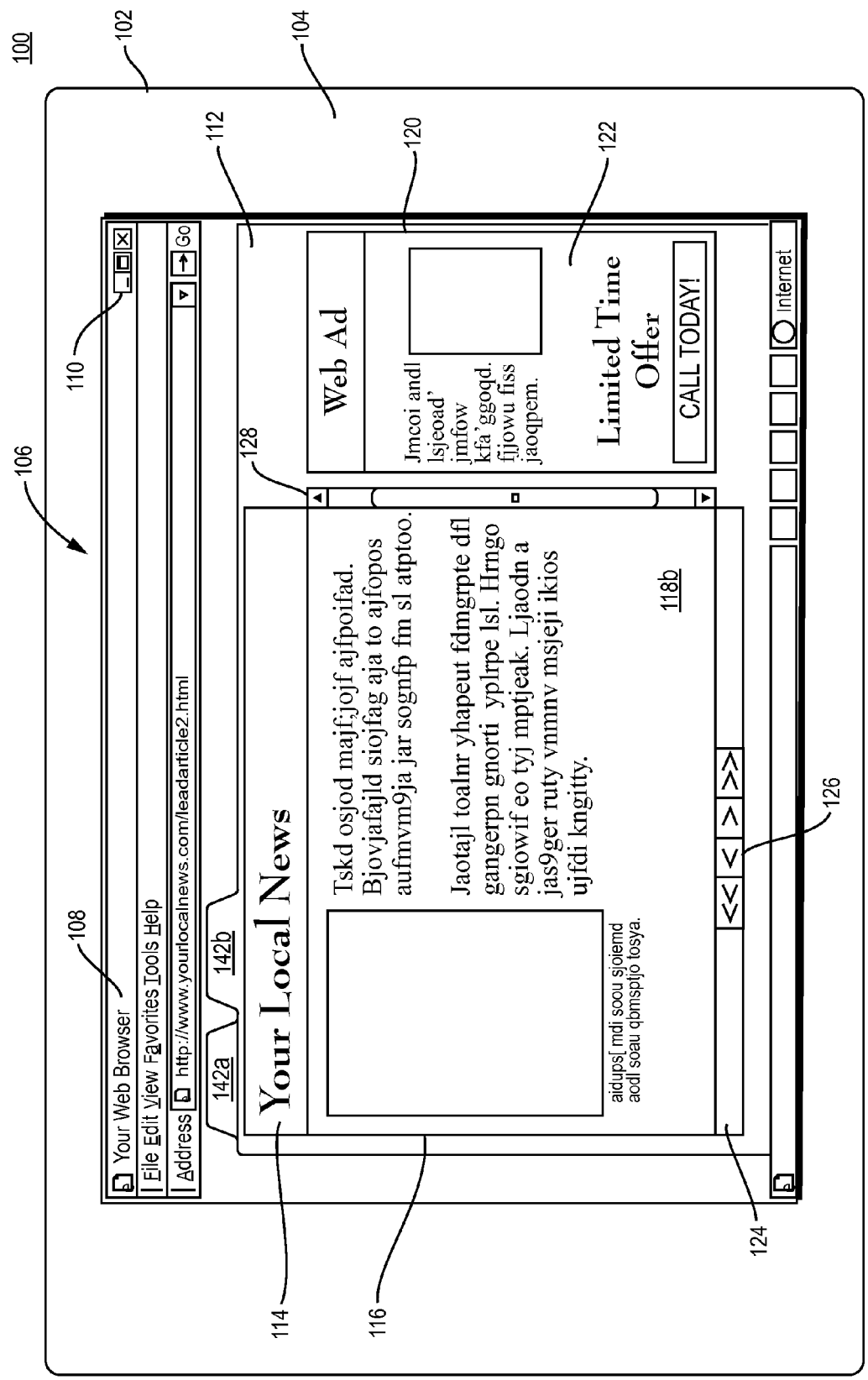
Figure 1F:
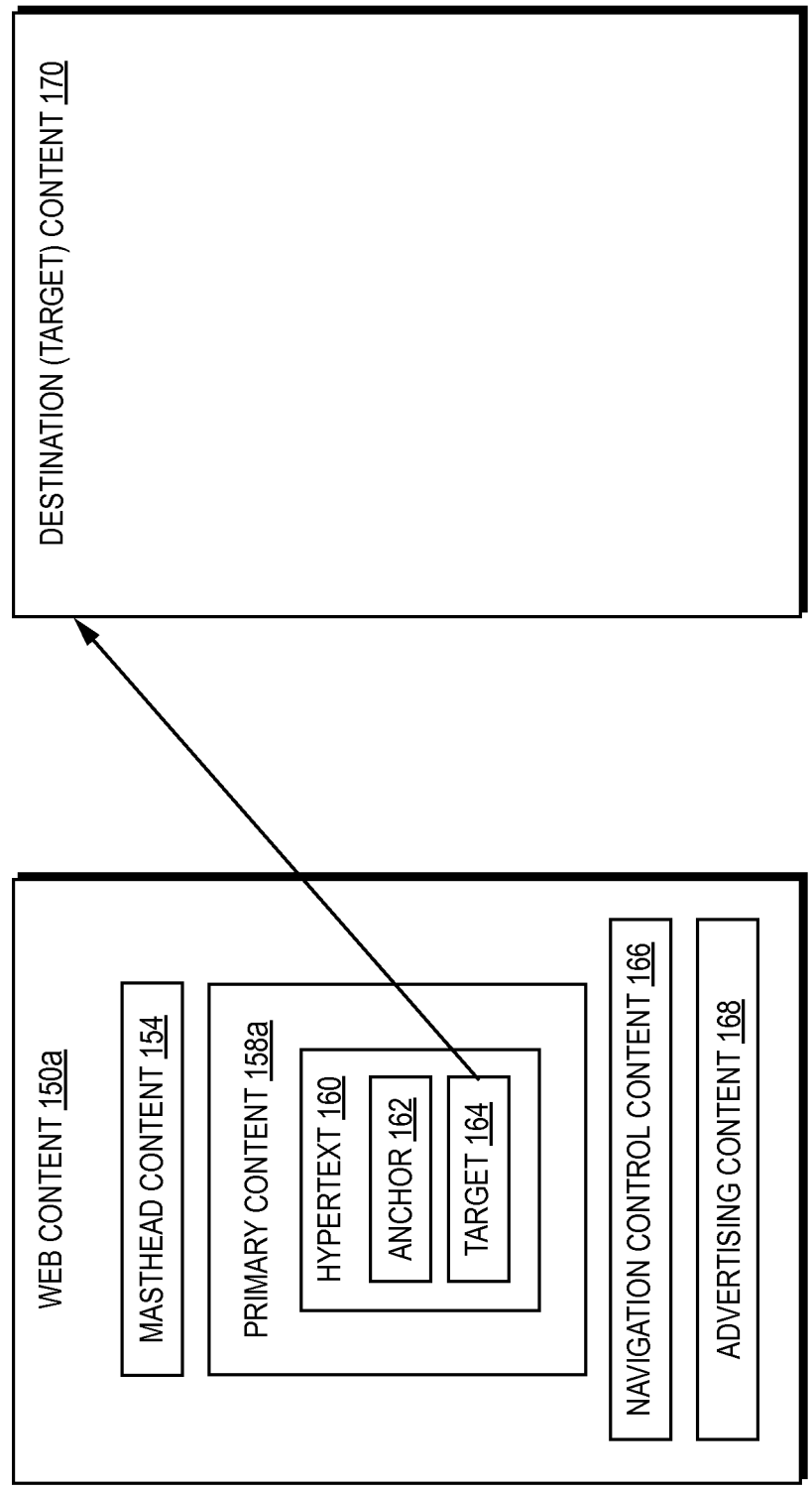
FIG. 1F is a diagram of prior art hyperlinked content.

As yet another example of navigation to the target of a hyperlink, consider the example of FIG. 1D, in which the primary content rendering 118*a* is displayed in a first tab 142*a*. In this example, navigating to the target content 170 of hypertext 130 may cause the application to open a new tab 142*b*, to switch to the new tab 142*b* (i.e., to make the new tab 142*b* the active tab within the application), and to render the target content 170 within the tab 142*b* as primary content rendering 118*b*. The result is shown in FIG. 1E.

The tab 142*b* is "new" in the sense that it was not open before the user selected the hypertext 130 and before the primary content rendering 118*b* was rendered into the tab 142*b*. In the example shown in FIGS. 1D-1E, the process of switching to the new tab 142*b* (i.e., making the new tab 142 the active tab) causes the rendering 118*b* of the target content 170 in the new tab 142*b* to replace the rendering 118*a* of the original primary content 158*a*. Even if the process of creating the new tab 142*b* does not cause the new tab 142*b* to automatically become the active tab, if the user wishes to view the contents 118*b* of the new tab 142*b*, the user must manually select the new tab 142*b*, thereby causing the new tab 142*b* to become the active tab, and thereby causing the results just described.

To re-view the original primary content rendering 118*a*, the user must manually close the new tab 142*b* or manually select the original tab 142*a* to cause the original primary content rendering 118*a* to once again be visible.

As mentioned in the Background section, the conventional user interfaces of FIGS. 1A-1E have a variety of disadvantages. Various embodiments of the present invention overcome these disadvantages and provide additional benefits as will now be described. However, before describing particular features of embodiments of the present invention, it should be noted that such embodiments may include any one or more of the features of conventional user interfaces described above. For example, embodiments of the present invention may be used in connection with computing devices having monitors and capable of displaying application windows containing hypertext. Therefore, such conventional features which may be contained within embodiments of the present invention will not be repeated below.

Figure 2A:
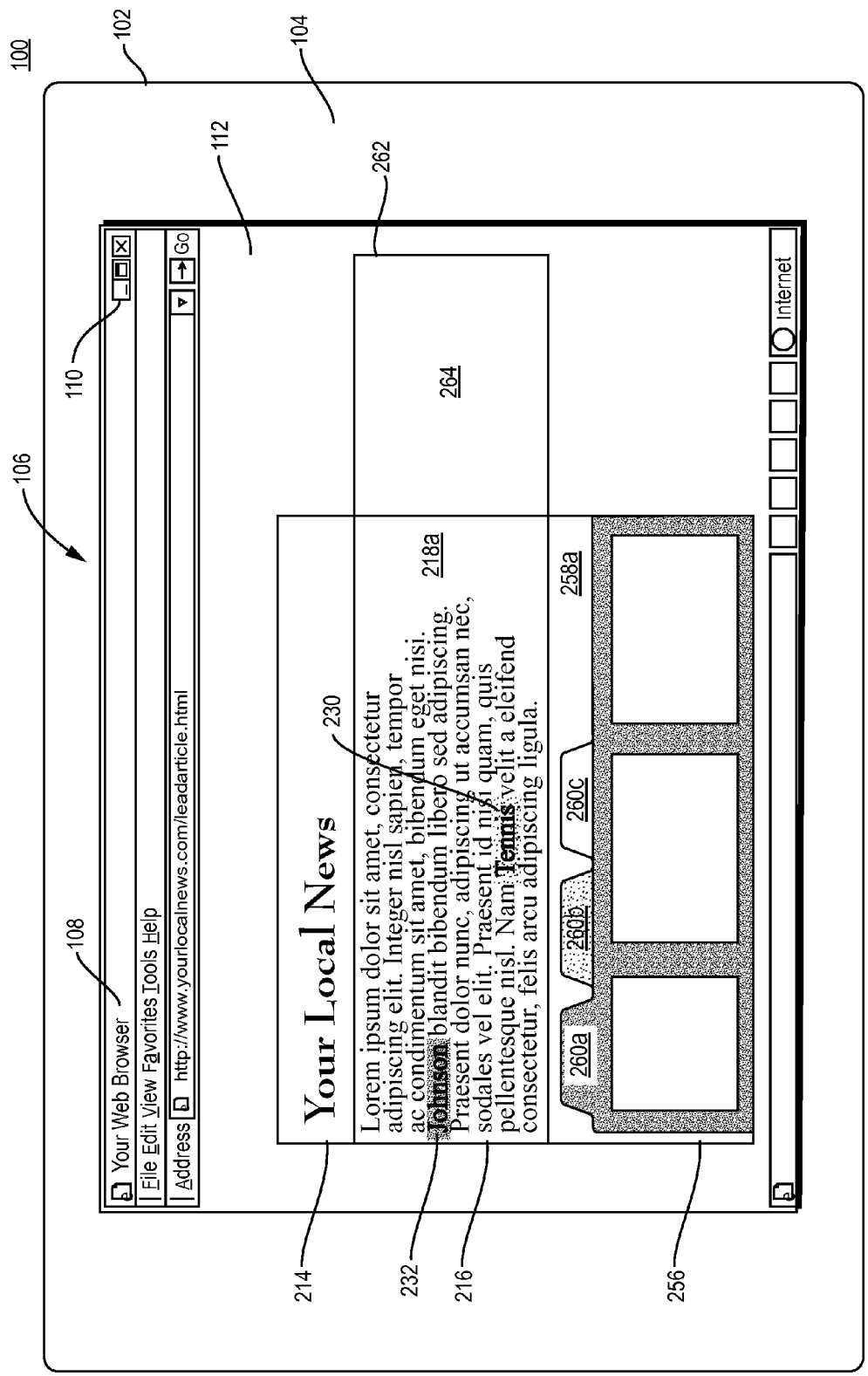
FIGS. 2A-2C are diagrams of user interfaces for rendering and navigating hypertext documents according to various embodiments of the present invention.

FIG. 2A shows computing device 100 executing an application that implements one embodiment of the present invention. In the particular example shown in FIG. 2A, the application may be a conventional application, such as a conventional web browser (e.g., Internet Explorer, Firefox, or Safari), in which case the features of embodiments of the present invention disclosed below may be implemented, for example, solely using data rendered and/or executed by the application, but without requiring any modifications to the application itself. For example, embodiments of the present invention may be implemented solely using content that is stored in a standardized presentation format that is transmissible over the Internet, such as HTML, Java, JavaScript, Flash, or any combination thereof. Embodiments of the present invention may, in other words, be implemented without requiring any modifications to the source code or object code of the application, without requiring the application to be recompiled, without requiring any plug-ins to be installed in the application, and without requiring any software to be executed in addition to the application on the computing device 100.

Alternatively, however, some or all of the features of embodiments of the present invention may be integrated into the application in any of a variety of ways, such as by modifying the source code and/or object code of the application, or by installing a plug-in in the application. As yet another example, some or all of the features of embodiments of the present invention may be implemented in a standalone application that is capable of performing any or all of the functions disclosed herein.

As particular examples, embodiments of the present invention may be implemented: (1) solely in one or more web pages rendered by conventional web browsers, without the need to design or execute additional software, such as web browser plugins; (2) using a combination of web pages and web browser plugins for enabling conventional web browsers to provide the functionality disclosed herein in connection with the web pages; or (3) using a self-contained standalone reader application that provides the functionality disclosed herein in connection with web pages or other content.

Furthermore, although in the examples disclosed above, the application associated with the window 106 is an application that executes on the computing device 100, this is merely an example and does not constitute a limitation of the present invention. Alternatively, for example, some or all of the features of embodiments of the present invention may be implemented on a device (not shown) other than the computing device 100, wherein the other device enables the computing device 100 to provide the user interface functionality disclosed herein. For example, features of embodiments of the present invention may be implemented using server-side code which, when executed, causes content to be rendered on the monitor 102 of the device. These and other divisions of labor between the device 100 and servers and other devices will be apparent to those having ordinary skill in the art based on the disclosure herein.

Figure 6A:
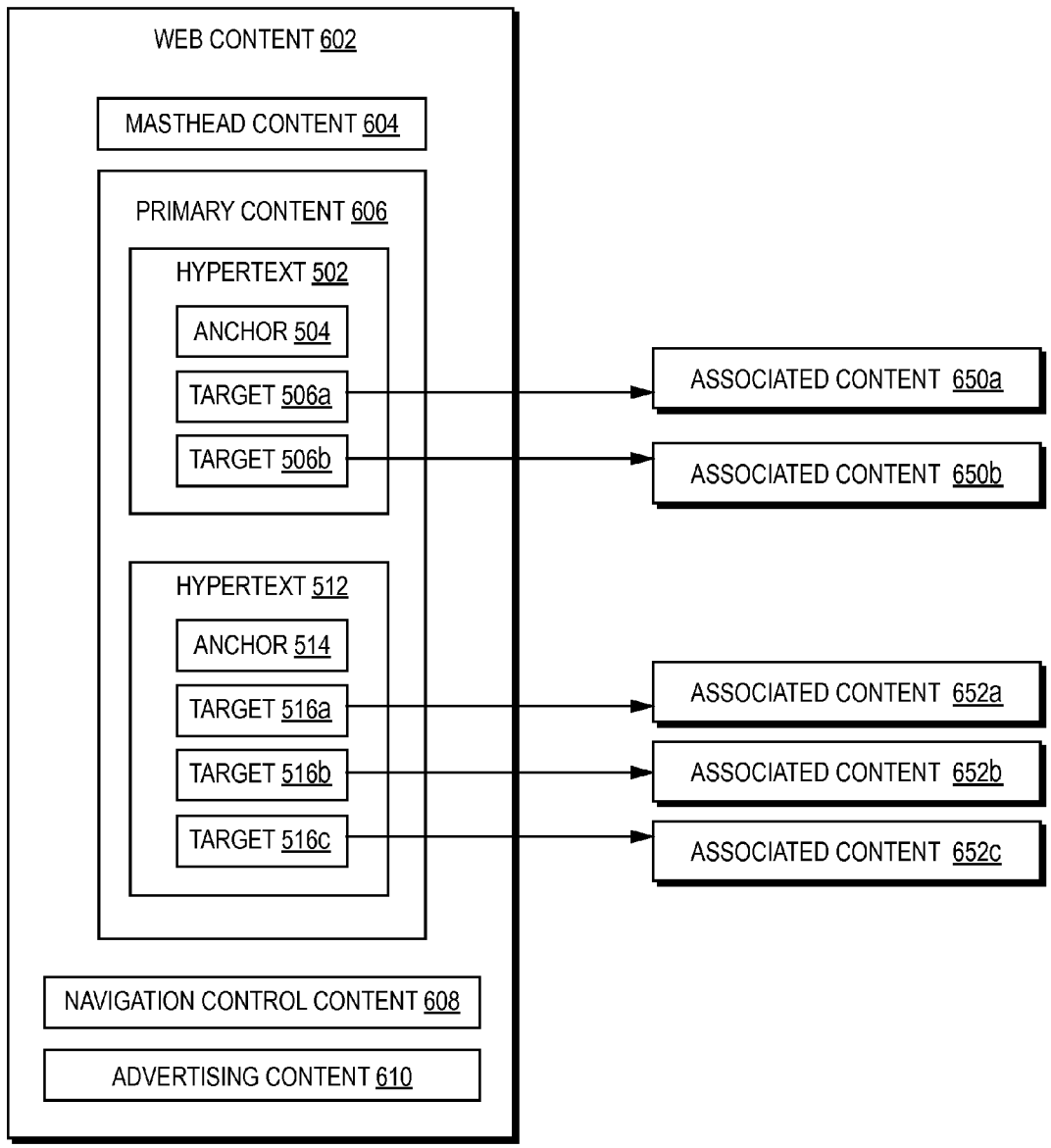
FIGS. 6A-6B are diagrams of hyperlinked content used by various embodiments of the present invention.

Referring again to FIG. 2A, in the embodiment of the present invention shown therein, computing device 100 contains monitor 102, in which application window 106 is displayed. For purposes of example, content within the application window 106 in FIG. 2A has a particular layout. This particular layout, however, is merely an example and does not constitute a limitation of the present invention. The layout includes a primary content display area 216 for displaying a rendering 218*a* of primary content, such as the text of some or all of a news article. For example, referring to FIG. 6A, an illustration is shown of web content 602, such as an HTML document, that contains various content that may be rendered within the application display area 112 of FIG. 2A. FIG. 6A shows just a few examples of content that may be rendered within the application display area 112, but those having ordinary skill in the art will understand that the web content 602 may contain other content that is necessary or useful for creating the rendering shown in FIG. 2A. For example, the web content 602 may contain primary content 606 for creating the primary content rendering 218*a* in FIG. 2A.

The layout shown in FIG. 2A also includes a masthead rendering 214, which may, for example, be a rendering of masthead content 604 (FIG. 6A) and contain the name of a newspaper (e.g., "The New York Times" or "The San Jose Mercury News"). The masthead rendering 214 may be hyperlinked to the home web of the newspaper's web site.

The layout shown in FIG. 2A also includes an associated content area 256 for displaying a rendering 258*a* of content (referred to herein as "associated content") that is associated with the primary content 606 represented by the primary content rendering 218*a*. For example, as will be described in more detail below, first hypertext rendering 230 may be a rendering of first hypertext 502 (FIGS. 5A and 6A) within the primary content 606. First hypertext 502 may have one or more targets (destinations) 506*a-b*, and the associated content rendering 258*a* shown within the associated content area 256 may be a rendering of content pointed to by one of the targets 506*a-b*.

Figure 5A:
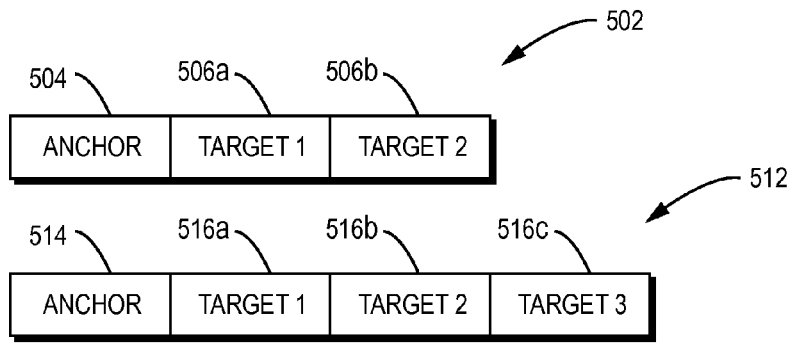
FIGS. 5A-5B are diagrams illustrating relationships between multi-destination hyperlinks and facets according to various embodiments of the present invention.

Before describing the operation of the user interface shown in FIG. 2A, certain embodiments of multi-destination links will be described. Referring to FIG. 5A, the structures of two multi-destination links 502 and 512 that may be used in conjunction with embodiments of the present invention are shown. The particular multi-destination links 502 and 512 shown in FIG. 5A are merely examples and do not constitute limitations of the present invention. Furthermore, multi-destination links for use in conjunction with embodiments of the present invention may be implemented using any kind of data structure, such as XML, XHTML, or HTML tags, linked lists, or arrays.

Link 502 includes an anchor 504 and targets 506*a* and 506*b*. Link 512 includes anchor 514 and targets 516*a*, 516*b*, and 516*c*. For purposes of the following discussion, assume that the first hypertext 230 shown in FIG. 2A is a rendering of anchor 504 in link 502, and that the second hypertext 232 shown in FIG. 2A is a rendering of anchor 514 in link 512. As this example illustrates, any particular multi-destination link may include any number of targets, and different multi-destination links may contain the same or different number of targets as each other.

In certain embodiments of the present invention, a target in a multi-destination link may be associated with a "facet." Different multi-destination links may be associated with the same or different facets as each other. As used herein, the term facet refers to any feature that multiple targets may share in common. Different facets may represent, for example, different categories of content. In the particular example shown in FIG. 5B, there are three facets 520*a-c*, although there may be any number of facets. For example, assume solely for purposes of example in the following discussion that the three facets 520*a-c* represent three content categories: encyclopedia entries, advertising content, and map content, respectively. Examples of other facets include, but are not limited to, tickets, reviews, fan information, player statistics, images, videos, shopping, travel, and news.

Link destinations associated with facets may, for example, be links to static or dynamic content. For example, a link destination associated with a "biography" facet may be a link to a static web page containing a biography of a particular person. As another example, a link destination associated with a "map" facet may be a link to a dynamic map web page, such as Mapquest or Google maps, in which the link anchor (e.g., ("Portland, Oreg.") is embedded as a parameter in the link destination so that when the destination content is rendered, a map of the appropriate location is rendered dynamically. The same is true, for example, of dynamic links to search engines, e-commerce sites, and social networking sites.

Figure 5B:
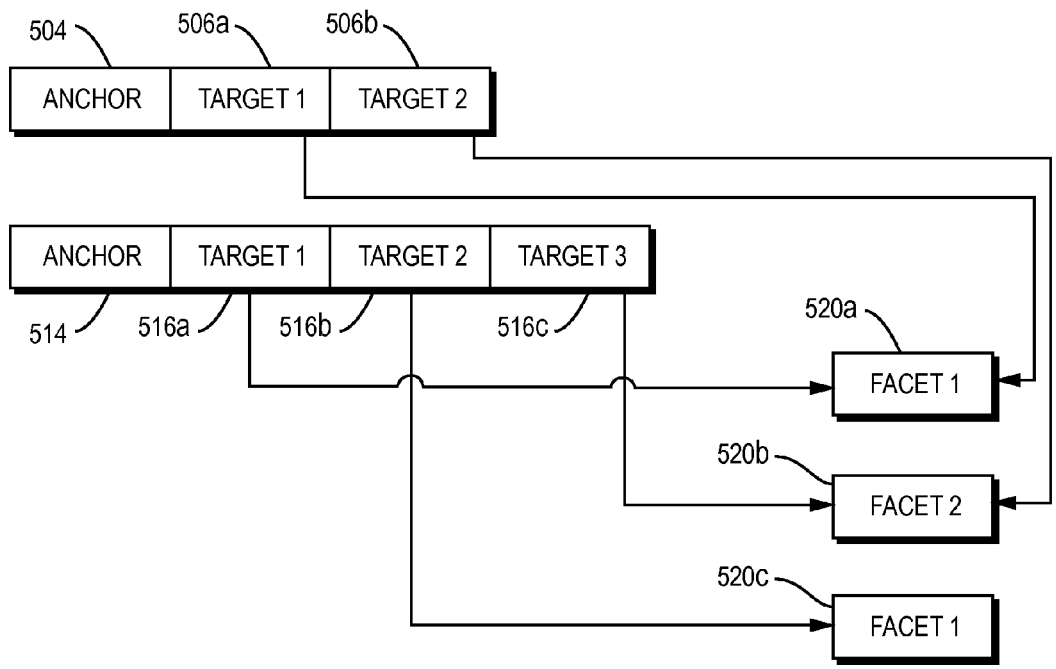

FIG. 5B illustrates the facets that are associated with targets in the links 502 and 512. More specifically, target 506*a* is associated with facet 520*a*, target 506*b* is associated with facet 520*b*, target 516*a* is associated with facet 520*a*, target 516*b* is associated with facet 520*c*, and target 516*c* is associated with facet 520*b*. This particular mapping of targets 506*a-b* and 516*a-c* to facets 520*a-c* is merely an example and does not constitute a limitation of the present invention. Furthermore, although only one-to-one mappings are shown in FIG. 5B for ease of illustration, target-facet mappings may be one-to-many, many-to-one, or many-to-many.

As the example in FIG. 5B illustrates, different links may be associated with a different number of facets than each other. Furthermore, a target in one link may be associated with a facet that is not associated with any target in another link (as illustrated by facet 520*c*, which is associated with target 516*b* in link 512 but not with any target in link 502).

Furthermore, facets are optional. They may also be used selectively. For example, in a link such as link 502, target 506*a* may be associated with a facet, while target 506*b* may not be associated with any facet. As another example, all targets 506*a-b* in link 504 may be associated with facets, while none of the targets 516*a-c* may be associated with facets.

The associations between targets and their corresponding facets may be represented in any way. For example, a single data structure may represent the link 502 and include data representing the anchor 504, targets 506*a-b*, associated facets 520*a-b*, and the associations between targets 506*a-b* and their associated facets 520*a-b*. As another example, a first data structure may include data representing all available facets 520*a-c*. A second data structure may represent the link 502 and include data representing the anchor 504, targets 506*a-b*, and the associations between targets 506*a-b* and their associated facets 520*a-b*. Those having ordinary skill in the art will understand how to implement the data illustrated in FIGS. 5A and 5B in a variety of other ways.

Figure 3A:
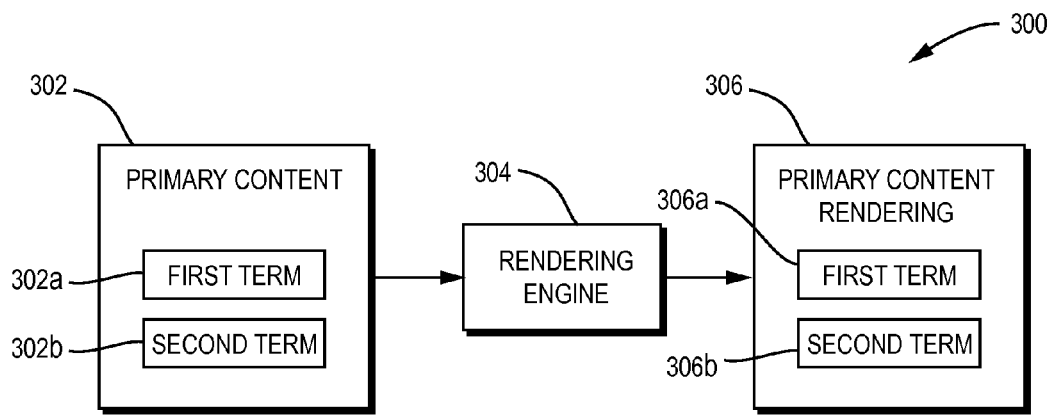
FIGS. 3A-3C are diagrams illustrating the use of a rendering engine to render hypertext content according to various embodiments of the present invention.

Various techniques for use in connection with the user interface of FIG. 2A will now be described. Referring to FIG. 3A, a dataflow diagram is shown of a system 300 for controlling the user interface of FIG. 2A according to one embodiment of the present invention. Referring to FIG. 4A, a flowchart is shown of a method 400 performed by the system 300 of FIG. 3 according to one embodiment of the present invention.

As shown in FIG. 2A, the primary content rendering 218*a* includes a rendering 230 of first hypertext 502 (FIGS. 5A-5B and 6A). Although element 502 is referred to herein as a "term" and may be or include text, such as a character, word, phrase, sentence, or paragraph, more generally the term 502 may include any kind of content that may serve as the anchor for a hyperlink, such as an image or video. The same is true of second hypertext term 512, which is represented in FIG. 2A by second hypertext rendering 232. Although primary content rendering 218*a* may include renderings of any number of hypertext terms, only two such renderings 230 and 232 are shown in FIG. 2A for purposes of example.

The first term 502 may be associated with a first plurality of associated contents. For example, as described above with respect to FIGS. 5A-5B, first rendering 230 may be a rendering of first link 502, which may have an anchor 504 (rendered within rendering 230), first target 506*a*, and second target 506*b*. First target 506*a* may point to first associated content 650*a*, while second target 506*b* may point to second associated content 650*b*. In this example, the first hypertext 502 is said to be associated with the first and second associated contents 650*a* and 650*b* pointed to by the first and second targets 506*a-b*.

Similarly, the second term 512 may be associated with a second plurality of associated contents. For example, as described above with respect to FIGS. 5A-5B, second rendering 232 may be a rendering of second link 512, which may have an anchor 514 (rendered within rendering 232), third target 516*a*, fourth target 516*b*, and fifth target 516*c*. Third target 516*a* may point to third associated content 652*a*, fourth target 516*b* may point to fourth associated content 652*b*, and fifth target 516*c* may point to fifth associated content 652*c*. In this example, the second hypertext 512 is said to be associated with the third, fourth, and fifth associated contents 652a-c pointed to by the third, fourth, and fifth targets 516a-c, respectively.

The system 300 (FIG. 3A) includes a rendering engine 304 that renders the primary content 302 to produce a rendering 306 of the primary content 302 (FIG. 4, operation 402). The primary content rendering 218a shown in FIG. 2A is an example of the rendering 306 shown more abstractly in FIG. 3A. The process of rendering 402 the primary content 302 includes rendering the first term 302a to create a rendering 306a of the first term 302a (FIG. 4, operation 402a) and rendering the second term 302b to create a rendering 306b of the second term 302b (FIG. 4, operation 402b). The first and second term renderings 230 and 232 in FIG. 2A are examples of the first and second term renderings 306a and 306b, respectively, shown more abstractly in FIG. 3A.

Note that the rendering engine 304 may, in certain embodiments of the present invention, be an existing conventional rendering engine, such as an existing rendering engine of a conventional web browser, in which case embodiments of the present invention may provide instructions to or otherwise control the existing rendering engine to perform the functions disclosed herein. As a result, embodiments of the present invention need not include the rendering engine 304, but may instead control or otherwise interoperate with the rendering engine 304.

The first term 302a may be associated with first associated content 310a and second associated content 310b. For example, referring again to FIG. 5A, the hypertext 502 of FIG. 5A may be the first term 302a shown in FIG. 3B, in which case the first target 506a may point to first associated content 310a and the second target 506b may point to second associated content 310b. Another illustration of the same example is shown in FIG. 6A, in which hypertext 502 includes a first target 506a that points to first associated content 650a and a second target 506b that points to second associated content 650b.

Figure 3B:
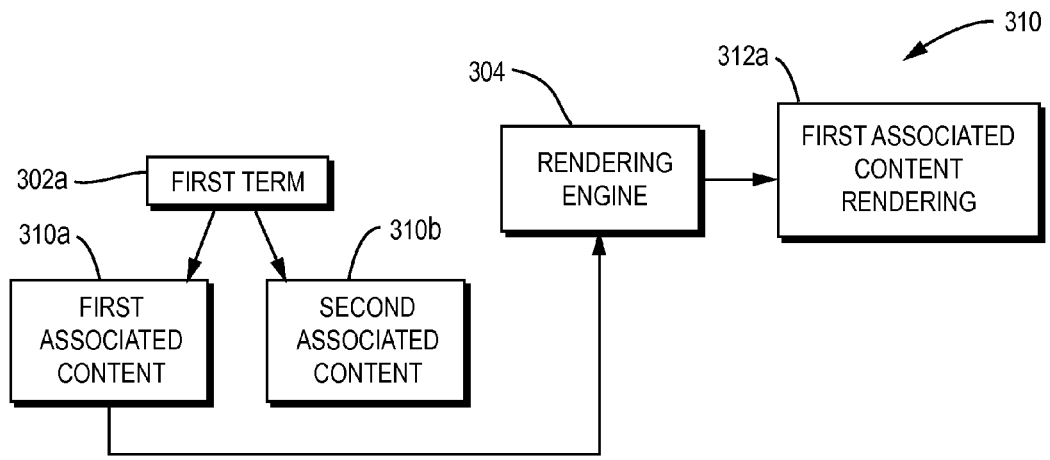
Figure 4A:
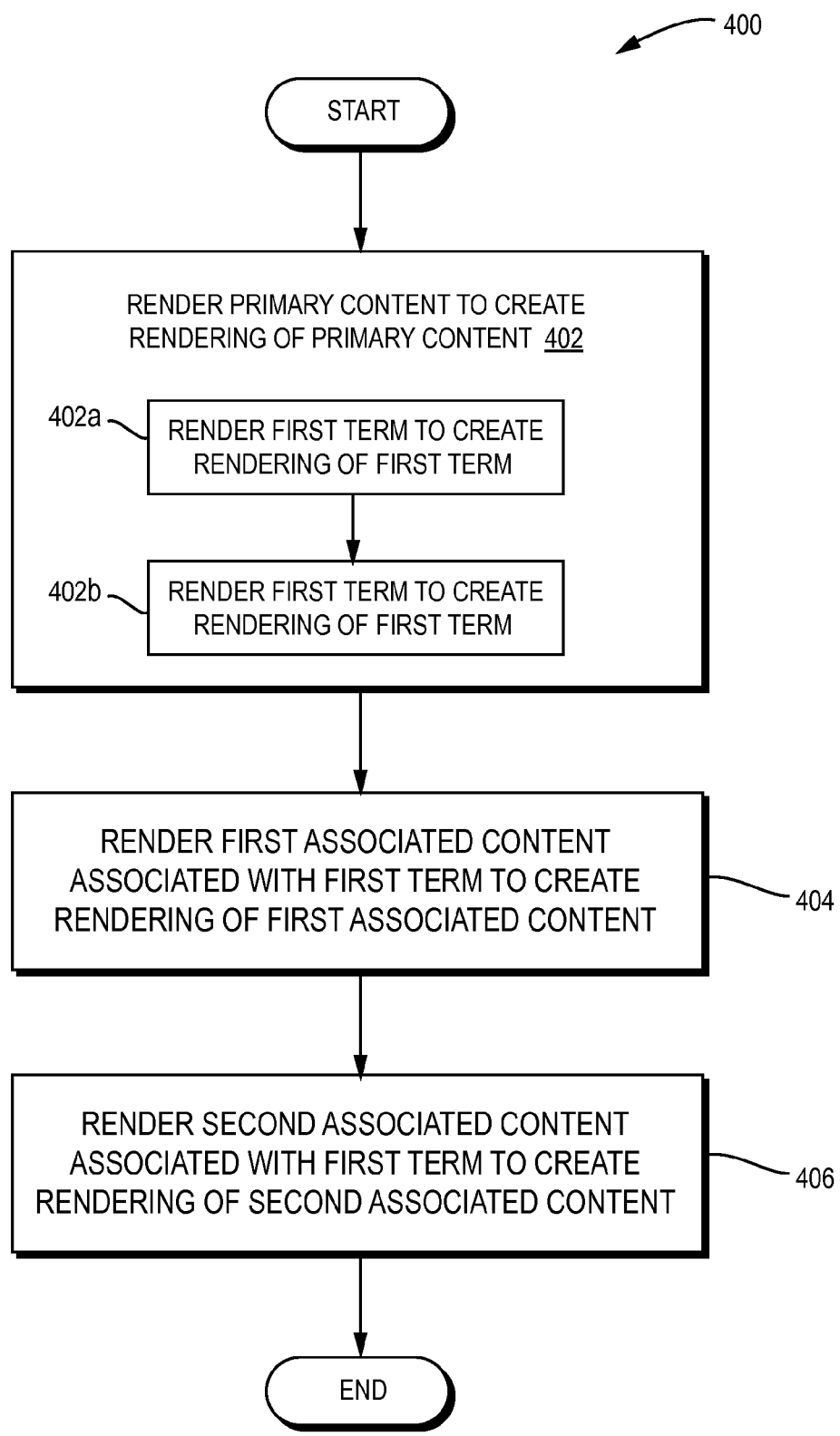
FIGS. 4A-4C are flowcharts of methods performed by various embodiments of the present invention.

As shown in FIG. 3B, the rendering engine 304 may render the first associated content 310a to create a rendering 312a of the first associated content 310a in a first existing display area (FIG. 4A, operation 404). The term "existing display area" refers to a display area within the monitor display area 104 that existed before the first associated content 310a was rendered. Examples of existing display areas include existing windows and portions thereof and existing frames and portions thereof. For example, assuming that associated content area 256 (FIG. 2A) was already displayed on-screen (e.g., as a frame within application window 106) before the first associated content 310a was rendered within the associated content area 256 to produce associated content rendering 258a, then associated content area 256 is an example of an "existing display area" as that term is used herein.

Rendering the first associated content 310a in an existing display area may, for example, involve rendering the first associated content 310a without opening a new window, new frame, or new tab.

The previously-rendered rendering 306 of the primary content 302 (e.g., primary content rendering 218a in FIG. 2A) remains fully visible after the first associated content 310a is rendered to create the first associated content rendering 312a (e.g., first associated content rendering 258a). One way in which this result may be accomplished, as shown in FIG. 2A, is to create the first associated content rendering 258a in a frame or other display area that is distinct from and does not overlap with the display area 216 in which the primary content rendering 218a is displayed. The non-overlapping relationship between the primary content rendering 218a and the associated content rendering 258a may be enforced in a variety of ways, such as by displaying the primary content rendering 218a and the associated content rendering 258a in distinct frames in the same window, by making the sizes and/or positions of the primary content display area 216 and/or the associated content display 256 area fixed, by enforcing layout rules which move and/or resize the primary content display area 216 and/or the secondary content display area 256 in response to movement and/or resizing of one or the other of the display areas 216 and 256, or by otherwise prohibiting one of the two display areas 216 and 256 from being moved and/or resized in any way that causes one of the display areas 216 and 256 to overlap with the other.

The first associated content rendering 312a may be rendered without requiring that the primary content display area 216 be refreshed or otherwise modified. In particular, the rendering engine 304 may render the first associated content 310a to create the first associated content rendering 312a without erasing, re-rendering, reloading, refreshing, or otherwise modifying the existing rendering 306 of the primary content 302. The first associated content rendering 312a, therefore, does not in whole or in part replace, obstruct, overlap with, or obscure the primary content rendering 306.

Figure 3C:
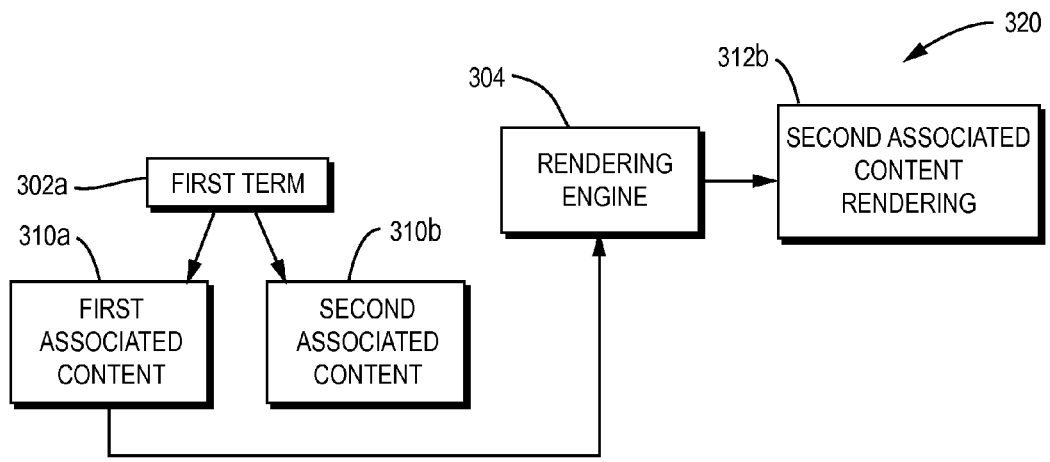

As shown in FIG. 3C, the rendering engine 304 may render the second associated content 310b to create a rendering 312b of the second associated content 310b in a second existing display area (FIG. 4A, operation 406). Note that the second existing display area may be the same as the first existing display area. For example, if the first associated content rendering 312a was displayed within associated content area 256, the second associated content rendering 312b may also be rendered within the same associated content area 256, thereby replacing the rendering 258a of the first associated content in the associated content display area 256.

Alternatively, for example, if the first associated content rendering 312a was displayed within associated content area 256, the second associated content rendering 312b may be rendered within a different associated content area 262 as second associated content rendering 264. The additional associated content area 262 may not overlap with the first associated content area 256. As a result, the first associated content rendering 312a and the second associated content rendering 312b may be visible simultaneously. Note that the additional associated content area 262 is optional. There may, however, also be additional associated content areas beyond those shown in FIG. 2A.

The previously-rendered rendering 306 of the primary content (e.g., primary content rendering 218a in FIG. 2A) remains fully visible after the second associated content 310b is rendered to create the second associated content rendering 312b. This result may be accomplished in any of the ways described above for the first associated content rendering 312a. Similarly, the second associated content rendering 312b may be rendered without requiring that the primary content display area 216 be refreshed or otherwise modified, in any of the ways described above for the first associated content rendering 312a.

Note that web browsers and other applications use various kinds of display areas for displaying content. One common kind of display area is a window. In general, the term "window" refers to an enclosed, rectangular area on a display screen. A window, however, may have a shape other than a rectangle. Furthermore, some windows have additional features. For example, a window may be movable or immovable, resizable or non-resizable, closable or non-closable, maximizable or non-maximizable, displayable in full-screen mode or not displayable in full-screen mode, opaque or (fully or partially) transparent, have a border or no border, have or lack a menu, and have or lack a toolbar. Those having ordinary skill in the art will appreciate that windows may have such features, and other features, in any combination.

Furthermore, traditional web browsers enable users to "navigate" from one web page to another, by following (activating) hyperlinks from one web page to another. When using such traditional web browsers, navigating a link from a first web page to a second web page typically involves refreshing the application display area 112 so that a rendering of the second web page replaces the rendering of the first web page. However, as the examples herein illustrate, the process of navigating links according to embodiments of the present invention does not necessarily involve replacing or otherwise obscuring the existing rendering of the first web page. Instead, terms such as "navigation" and "navigating a hyperlink," as applied herein to embodiments of the present invention, include any process involving rendering the destination of a hyperlink (whether or not that destination is on a different web page or web site than the source (anchor) of the hyperlink), whether or not rendering refreshes the application display area 112 or replaces or otherwise obscures the existing rendering of the source (anchor) of the hyperlink. In particular, all of the examples shown and described in connection with FIGS. 2A-2C include examples of "navigating" hyperlinks as that term is used herein. For example, activating the hyperlink associated with hyperlink rendering 230 in FIG. 2A to cause associated content to be rendered in associated content area 256 is an example of "navigating" a hyperlink as that term is used herein.

The rendering engine 404 may render the first associated content 310a (FIG. 4, operation 404) in response to a user of the system 310 selecting the first term 302a, such as by clicking on or hovering over the rendering 230 of the first term 302a. Similarly, the rendering engine 404 may render the second associated content 310b (FIG. 4, operation 406) in response to the user of the system 312 selecting the first term 302a, such as by clicking on or hovering over the rendering 230 of the first term 230.

Once a particular term associated with a multi-destination link has been selected, a particular one of the term's multiple destinations must be selected for navigating and rendering. A particular destination within a multi-destination link may be selected in any of a variety of ways. For example, as illustrated by the method 410 of FIG. 4B, in general the user may provide input selecting a particular facet (operation 412), such as one of the facets 520a-c illustrated in FIG. 5B. The user may provide such input in any of a variety of ways.

Figure 4B:
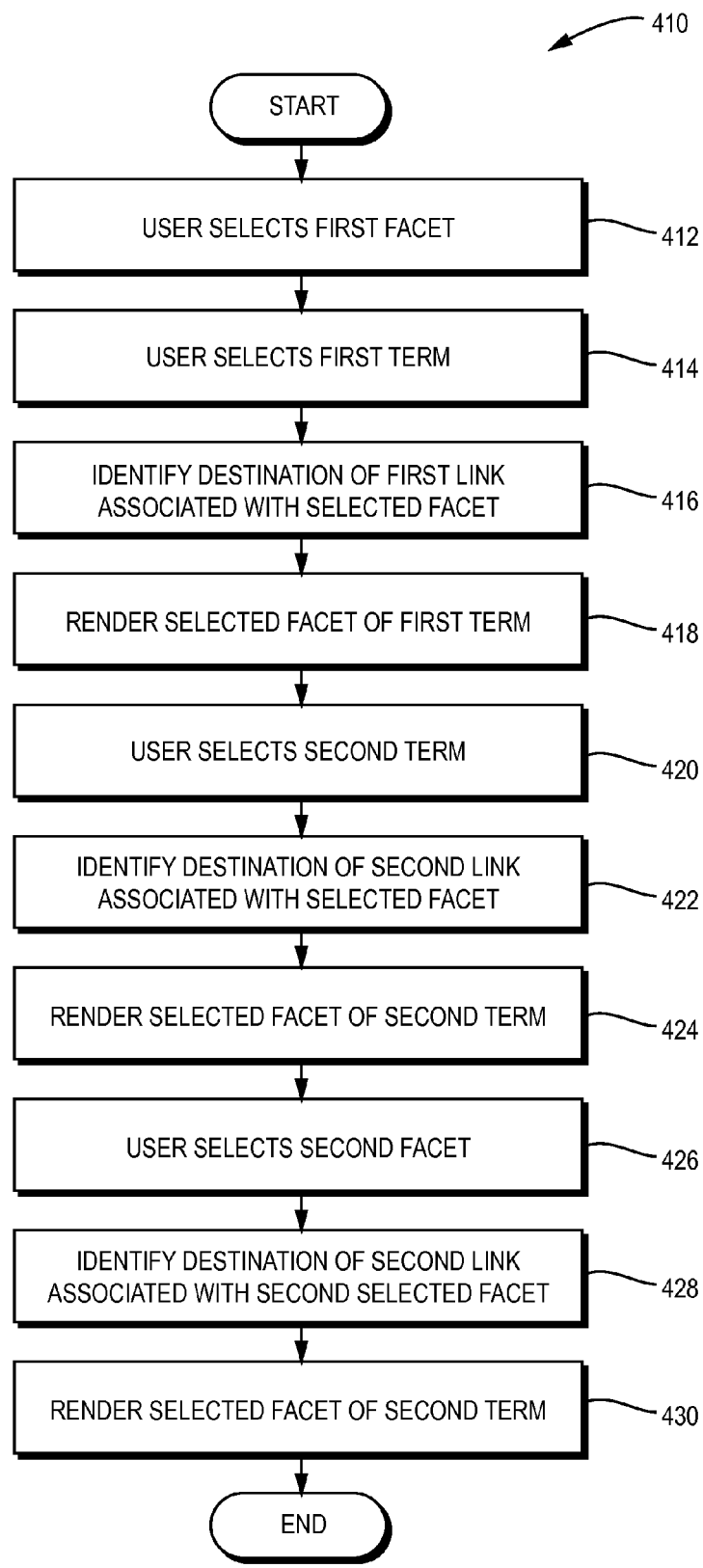

After selecting a particular facet, the user selects a first term associated with a first multi-destination link, such as the term represented by first term rendering 230 in FIG. 2A (FIG. 4B, operation 414). The method 410 identifies, from among the plurality of destinations of the first multi-destination link, a first destination, if any, associated with the facet previously selected in operation 412 (FIG. 4B, operation 416). If such a destination is found, the rendering engine 304 renders the associated content pointed to by the first destination identified in operation 416 (FIG. 4, operation 418). If no destination associated with the selected facet is found, then the rendering engine 304 may take an alternative action such as erasing the content currently rendered in the associated content area 256 or leaving the content currently rendered in the associated content area 256 unchanged.

The system may notify the user that a particular term in the primary content 302 is not associated with any content that is associated with a particular facet. For example, if the user selects term rendering 230 and term rendering 230 is not associated with any associated content that is associated with the facet corresponding to tab 260c, then tab 260c may be displayed in gray or otherwise disabled. As another example, term renderings within the primary content rendering 218a may be rendered in ways that indicate which facets are associated with them. For example, each facet may be associated with a particular color. The tab corresponding to each facet may be rendered in the color associated with that facet, and each rendering of a term in the primary content rendering 218a may be underlined with the color(s) of the facet(s) associated with the term. For example, if term rendering 230 is associated with the facets corresponding to tabs 260a and 260b, then term rendering 230 may be underlined twice, once with each color associated with tabs 260a and 260b. Those having ordinary skill in the art will appreciate that there are other ways to notify the user of the facet(s) associated with particular terms in the primary content 302.

At some later time, the user selects a second term associated with a second multi-destination link, such as by selecting the second term rendering 232 in FIG. 2A (FIG. 4B, operation 420). The method 410 identifies, from among the plurality of destinations of the second multi-destination link, a second destination, if any, associated with the facet previously selected in operation 412 (FIG. 4B, operation 422). The rendering engine 304 then renders the associated content pointed to by the second destination identified in operation 422 (FIG. 4, operation 424). If no destination associated with the selected facet is found, then any of the actions described above with respect to the operation 418 may be performed.

The method 410 illustrated in FIG. 4B thereby enables the user to make a single selection of a facet, and then to select multiple multi-destination links to cause the destinations of those links that are associated with the selected facet to be rendered, without requiring the user to re-select the facet each time. In other words, the user may select a facet only once, and then cause multiple destinations associated with that facet to be rendered simply by selecting links having those destinations.

The example user interface shown in FIG. 2A contains tabs 260a-c corresponding to facets 520a-c, respectively. At any time the user may click on or otherwise select any one of the tabs 260a-c to select the corresponding facet as the current facet. Such selection is an example of the facet selection in operation 412 of FIG. 4B. Tabs 260a-c are shown in FIG. 2A merely as examples and do not constitute limitations of the present invention. Alternatively, for example, the user interface may enable the user to select facets using buttons, hypertext, menu choices, dropdown lists, text commands, or voice commands.

If a particular multi-destination link has already been selected, then selecting a different facet as the current facet may cause the destination of the multi-destination link corresponding to the new facet to be displayed automatically, without requiring the multi-destination link to be re-selected. For example, referring again to FIG. 4B, if the user selects a second facet that differs from the facet previously selected in operation 412 (operation 426), then the method 410 may identify, from among the plurality of destinations of the second multi-destination link (i.e., the multi-destination link previously selected in operation 420), a third destination associated with the second facet selected in operation 426 (FIG. 4B, operation 428). The rendering engine 304 then renders the associated content pointed to by the third destination identified in operation 428 (FIG. 4, operation 430).

The method 410, in other words, enables multiple destinations of a multi-destination link to be rendered sequentially simply in response to the user selecting different facets associated with the link, without requiring the user to re-select the link itself each time. For example, in the user interface of FIG. 2A, the user may select term 302a by selecting term rendering 232 once, and then select tabs 260a, 260b, and 260c (in any sequence) to cause the associated contents that are destinations of term 302a associated with facets 520a, 520b, and 520c respectively, to be rendered without requiring the user to reselect term rendering 232.

As illustrated by the example of the tabs 260a-260c, the process of receiving user input that selects a particular facet need not obscure the rendering 218a of the primary content 302. For example, the user may click on one of the tabs 260a-c and thereby select a corresponding one of the facets 520a-c without causing a popup window to be displayed (over the primary content window 216 or elsewhere) and without otherwise obscuring the rendering 218a of the primary content 302. Because facets may be associated with destinations in multi-destination links, this is an example in which the user may select a particular destination of a multi-destination link without causing a popup window to be displayed and without otherwise obscuring the rendering 218a of the primary content 302.

Only a portion of the primary content 302 may be rendered as the primary content rendering 306. For example, in FIG. 2A, the primary content rendering 218a may represent only a portion, such as the first page, of the underlying primary content 302, such as a news article. Although conventional tools, such as a vertical scrollbar, may be provided to enable the user to view other portions of the primary content 302, embodiments of the present invention also provide other mechanisms to enable other portions of the primary content 302 to be rendered and viewed under control of the user.

Figure 2B:
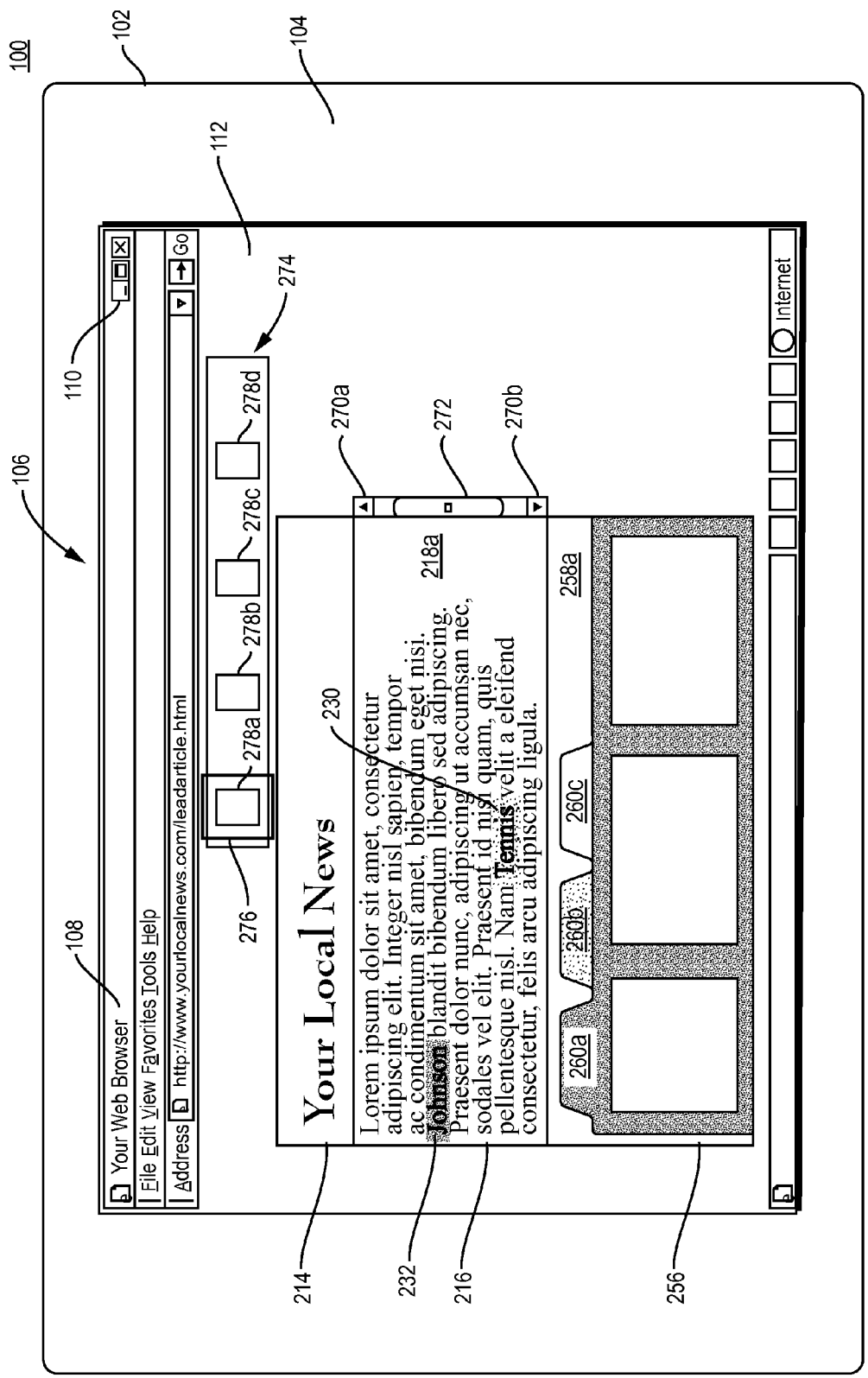

For example, referring to FIG. 2B, an embodiment is shown in which navigation buttons 270a-b and text field 272 are provided to enable the user to navigate from page to page within the primary content 302. In response to the user clicking on the previous page button 270a, the system may render the page of the primary content 302 immediately preceding the page currently displayed in the primary content rendering 218a. Similarly, in response to the user clicking on the next page button 270b, the system may render the page of the primary content 302 immediately following the page currently displayed in the primary content rendering 218a. In response to the user typing a page number in the page number field 272, the system may render the page having the page number entered by the user. Pages may, for example, be measured in terms of the amount of the maximum amount of content that may be rendered within the primary content display area 216.

The particular user interface elements 270a-b and 272 shown in FIG. 2B are merely examples and do not constitute limitations of the present invention. More generally, embodiments of the present invention may provide user interface elements that enable the user to cause different portions of the primary content 302 to be rendered without vertically scrolling through renderings of the primary content 302.

For example, embodiments of the present invention may provide various means for enabling the user to cause different portions of the primary content 302 to be rendered by horizontally scrolling through the primary content. As shown in the embodiment of FIG. 2B, the user interface may include a horizontal scrolling control 274 which displays thumbnails 278a-d of the various pages of the primary content 302 within a thumbnail container 276. In the particular example shown in FIG. 2B, the primary content 302 includes four pages, indicating that four display areas of the size of the primary content display area 216 are required to render the complete primary content 302.

A current page indicator 280 encloses the page currently represented by the rendering 218a in the primary content display area. The user may drag or otherwise move the current page indicator 280 horizontally along the thumbnail container 276 to cause the system to render the portion of the primary content 302 corresponding to the page currently underneath the current page indicator 280. For example, if the user moves the current page indicator 280 so that it enclosed thumbnail 278b, the system may in response render the portion of the primary content 302 that corresponds to thumbnail 278b within the primary content area 216, thereby replacing the currently-rendered primary content rendering 218a.

The system may provide additional visual indicators of the user's current location within the primary rendering. For example, page number indicators such as 1, 2, 3, and 4, may be displayed within the page thumbnails 278a-d and/or elsewhere. As another example page number and total page indicators such as 1/4, 2/4, 3/4, and 4/4 may be displayed within the page thumbnails 278a-d and/or elsewhere.

In this case and in other cases described herein in which one rendering replaces another, those having ordinary skill in the art understand that the transition from one rendering to the next may be visually indicated in any of a variety of ways, such as by erasing the first rendering and immediately rendering the second rendering in its place, by fading out the first rendering and simultaneously fading in the second rendering, or by "wiping" the first rendering out and the second rendering in to the primary content display area 216 (either horizontally or vertically). These and other methods for replacing one rendering with another all fall within the scope of embodiments of the present invention.

The primary content 302 may previously have been extracted from another source before being rendered and processed in any of the ways disclosed herein. For example, referring again to FIG. 1A, recall the rendering of the web page shown within the application display area 112. Such a web page may, for example, be a web page from a newspaper web site containing a news article. The rendering of the web page may include content other than the primary content 118a, such as advertisements 122, masthead 114, and navigational tools 124 such as buttons and hyperlinks.

Figure 6B:
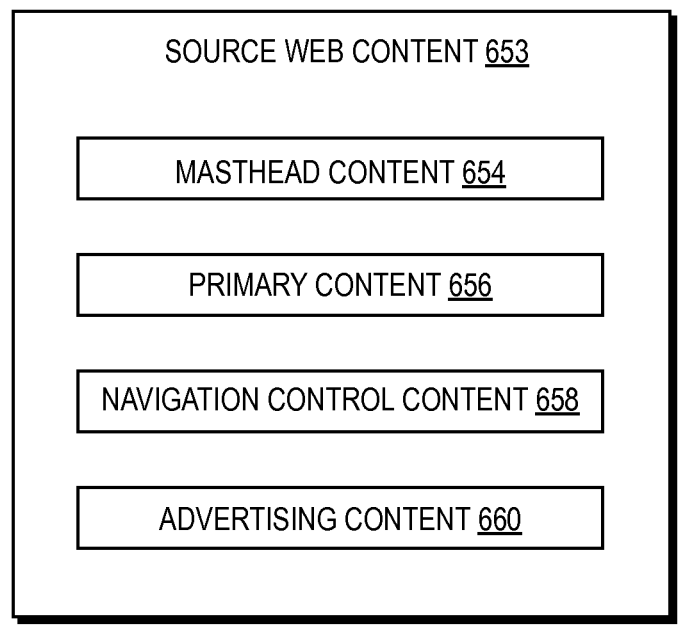

Referring to FIG. 6B, a diagram is shown of an example of the underlying source web content 653 (such as an HTML document) represented by the rendering in FIG. 1A. In other words, the rendering in FIG. 1A may be a rendering of the source web content 653 shown in FIG. 6B. In particular, the source web content 653 may include masthead content represented by the masthead rendering 114 in FIG. 1A, primary content 656 represented by the primary content rendering 118a in FIG. 1A, navigational control content 658 represented by the navigational control rendering 126 in FIG. 1A, and advertising content 660 represented by the advertising content rendering 122 in FIG. 1A.

Embodiments of the present invention may be used to extract only the article content, such as the primary content 656 and any other pages of the same article (if all such pages are not contained within the primary content 656), including data such as the article's headline, byline, and article (hyper) text. This extracted primary content may then be made available for viewing and browsing using the enhanced user interface described above.

The primary content 656 as rendered in the original web page (FIG. 1A) may be divided into pages in a different way than in the enhanced web page (FIGS. 2A-2B). For example, if the size of the source primary content area 116 is larger than the size of the enhanced primary content area 216, then the primary content 656 may be divided into a larger number of pages when displayed using the enhanced user interface.

Figure 4C:
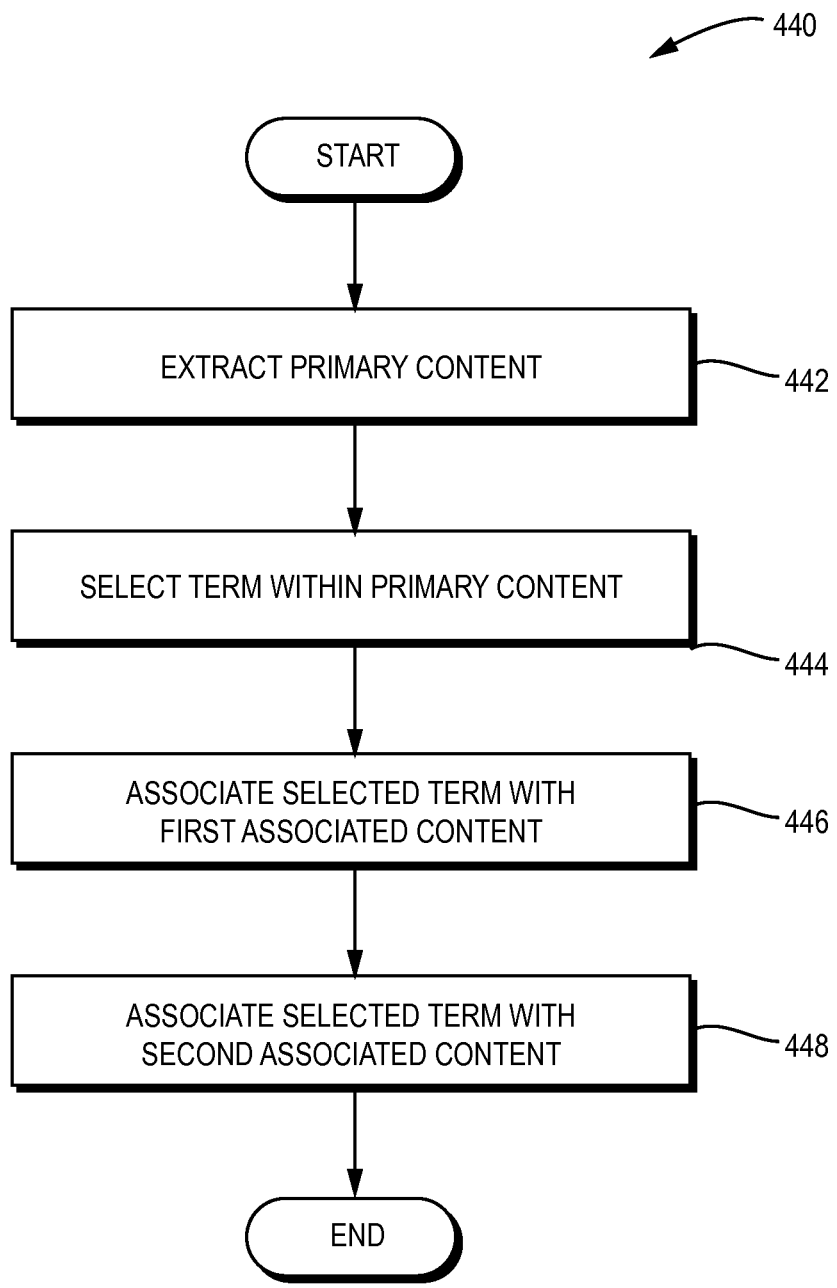

The extracted primary content may be enhanced after it has been extracted from the source web page and before it is made available for viewing and browsing using the enhanced user interface. For example, referring to FIG. 4C, a method 440 is shown for extracting and enhancing primary content according to one embodiment of the present invention. For example, the primary content 656 may or may not contain hyperlinks within the first (source) web page 653 (FIG. 6B). The primary content 656 may be extracted from the source web page 653 (FIG. 4C, operation 442), and a first term within the extracted primary content 656 may be selected (FIG. 4C, operation 444). A new hyperlink, such as a single-destination hyperlink and/or multi-destination hyperlink, may be added to the extracted primary content 656. For example, a multi-destination hyperlink may be added to the selected term by associating the selected term with first associated content (FIG. 4C, operation 446) and by associating the selected term with second associated content (FIG. 4C, operation 448). The resulting enhanced primary content may be used as the primary content 302 that is utilized by various embodiments of the present invention in the ways disclosed herein. For example, the primary content 606 shown in FIG. 6A may be enhanced primary content resulting from the extraction and enhancement process shown in FIG. 4C.

For example, if it is desired that selected terms in the extracted primary content be linked to encyclopedia entries, advertising content, and map content, where possible, then each selected term may be marked up with a multi-destination link having two or more destinations, where each of the destinations is associated with an encyclopedia entry, advertising content, or map content related to the selected term. Not all facets need be associated with all multi-destination links created in this way. For example, one multi-destination link may have three destinations associated with three corresponding facets, while another multi-destination link may have two destination associated with two corresponding facets.

The tagging performed in operations 444 and 446 of the method 440 of FIG. 4C may involve tagging the extracted primary content with static and/or dynamic links. In the case of dynamic links, the selected term may act both as the anchor of the link and as a parameter of a destination of the link. For example, in the case of a link destination that points to an advertising server, the link anchor may be provided as a parameter to the advertising server so that when the link destination is activated, the link anchor is provided as an input to the advertising server, in response to which the advertising server provides advertising content related to the link anchor. The advertising content may then be rendered. This is merely one example of a way in which terms in the primary content 656 may be extracted and then tagged with dynamic links.

As a particular example, a multi-destination link may be added to a selected term in the primary content 656, where at least one destination of the multi-destination link points to (static or dynamic) advertising content. Such advertising content may be the same as or differ from the advertising content 660 that the selected term was linked to in the source web page 653 from which the primary content 656 was extracted. As a result, when the selected term is rendered in the source web page 653, a first advertisement may be rendered in connection with the selected term, while when the selected term is rendered in the primary content 606 in the resulting web page 602 after extraction, a second advertisement that differs from the first advertisement may be rendered in connection with the selected term.

Figure 2C:
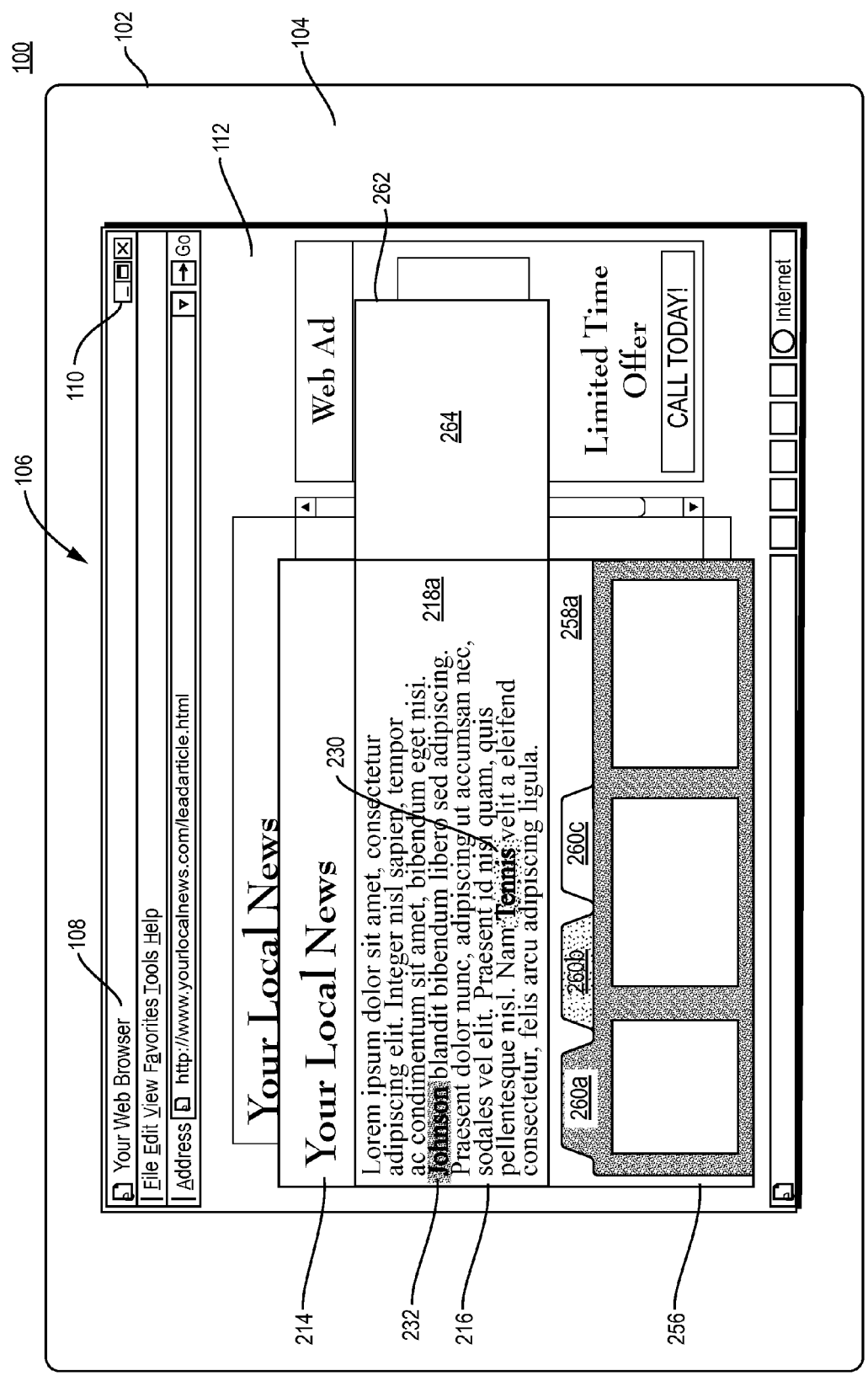

Furthermore, referring to FIG. 2C, once the primary content has been extracted and enhanced as described above, the enhanced primary content may be rendered in conjunction with the original web page from which the primary content was extracted. For example, the primary content rendering 218a, associated content rendering 258a, and masthead 214 may be rendered on top of, and thereby obscure at least part of, the source web page. At least part of the source web page may therefore be visible and active while embodiments of the present invention are active. The user may therefore, for example, click on a visible portion of the source web page to cause the renderings 214, 218a, and 258a to disappear and to return to the source web page 653. Alternatively, for example, a "close" button or other mechanism may be displayed or otherwise provided to enable the user to affirmatively indicate that the renderings 214, 218a, and 258a should disappear so that the rendering of the source web page 653 can become fully visible again.

Embodiments of the present invention have a variety of advantages, such as the following.

As mentioned earlier, one disadvantage of conventional techniques for displaying and navigating through web site content is that they can make it difficult for users to engage in the kind of nonlinear exploration of content for which the Web and hypertext were designed. For example, in conventional web site designs, clicking on a link within a news article typically causes the destination (target) of the link to be displayed by refreshing the web browser window to display the destination content, or by opening the destination content in a new tab or a new window. In any of these cases, the destination content may replace or obscure the source content, and it can be difficult, tedious, and time-consuming for the user to return to the point in the source content that contains the hyperlink. In contrast, embodiments of the present invention make it possible for the user to select a link and, in response, to see a rendering of the link's destination in a (possibly existing) display area that does not replace, overlap with, or obstruct the display area in which the primary content is displayed. As a result, the user may easily view both the primary content and the associated content simultaneously, and the user need not take any action to return to the primary content because the primary content always remains fully visible. This makes the user's reading experience more seamless, convenient and less disorienting.

As mentioned earlier, another drawback of conventional techniques for displaying and navigating through web site content is that pop-up advertisements typically appear on top of and thereby obscure the main article content. In contrast, embodiments of the invention allow advertising content to appear side-by-side the primary content, or to otherwise be rendered in a way that does not intrude upon the user's experience of reading the primary content. A related benefit of embodiments of the present invention is that they give the user control over whether to view advertisements. For example, if one of the available facets is "advertising" or "offers", the user may either select or de-select the advertising facet depending on the user's preference. If the user selects the "advertising" facet, then upon clicking on any tagged term, a corresponding advertisement related to the term (if available) will be displayed nonobtrusively.

Another drawback of conventional techniques for displaying and navigating through web site content is the article layout and navigation. Due to limitations in the way web content is published, text is usually presented in wide, single columns (which strain the eyes, especially with long-form articles), require north-south scrolling (causing the reader to scroll by and beyond ads and also losing article byline and site navigation tools), and usually require one or more page refreshes (which can be disorienting and cause frustrating delays depending upon internet speeds). In contrast, embodiments of the invention (1) present article content in convenient, easy-to-read column width text (used for centuries in printed newspapers and magazines for this reason), (2) eliminate north-south scrolling (keeping article title, byline, navigation tools, ads, masthead, etc. in fixed position), and (3) eliminate multiple page refresh (keeping the reader in a single place throughout the entire article).

All the above advantages result in a large single advantage for content providers who use embodiments of the present invention. Another disadvantage of conventional techniques for displaying and navigating through web site content is that due to the disadvantages noted above, consumers do not engage publisher's sites for much more than 3-6 minutes per day on average. This lack of engagement limits the consumer's ability to extract usable knowledge from the information, and also limits the content provider's ability to sustain or increase ad rates. Ad rates are often based on statistics such as "time-on-site" to measure return on investment. This is similar to viewership ratings on television. Embodiments of the invention are likely to engage readers for longer periods of time, deepening the reader's knowledge/insight, and also yielding strong ad rates/revenues to increase the likelihood of ensure publisher viability.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although various embodiments are disclosed herein as being applicable to HTML and other web-based content, these are merely examples. First, terms such as "web-based content" may refer to a wide variety of content, such as content containing one or more of HTML, XML, XHTML, Java, JavaScript, and Flash content. Second, embodiments of the present invention may be applied to content other than web content.

The terms "hypertext content" and "hyperlinked content" are used synonymously herein. Both terms refer to any content that includes one or more hyperlinks. The term "hypertext content" may include, but is not limited to, text content. Rather, hypertext content may include, for example, text, images, videos, executable code (e.g., Java or JavaScript), and links in which any such content is the anchor.

The computing device 100 may be any kind of computing device, including but not limited to desktop computers, laptop computers, personal digital assistants (PDAs), smartphones (such as the Apple iPhone), and tablet computers (such as the Apple iPad). The monitor 102 may be any kind of monitor, including but not limited to touchscreen monitors that are capable of both providing visual output and receiving touch input. Embodiments of the present invention are not limited to implementation on any particular computer platform, such as WinTel platforms, Unix platforms, and MacOS platforms.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for use with primary content, wherein the primary content includes:
- a first term, wherein the first term is associated with first associated content and second associated content, wherein the first associated content is associated with a first facet, and wherein the second associated content is associated with a second facet;
- a second term, wherein the second term is associated with third associated content and fourth associated content, wherein the third associated content is associated with the first facet, and wherein the fourth associated content is associated with the second facet;
- the method comprising:
  - (1) rendering at least part of the primary content to create a rendering of the at least part of the primary content, including rendering the first term to create a rendering of the first term and rendering the second term to create a rendering of the second term;
  - (2) receiving first user input selecting the first facet;
  - (3) receiving second user input selecting the first term;
  - (4) in response to receiving the second user input, rendering the first associated content to create a rendering of the first associated content in a first existing display area, wherein the rendering of the at least part of the primary content remains fully visible after the first associated content is rendered;

(5) receiving third user input selecting the second term; and (6) in response to receiving the third user input and without receiving additional input selecting the first facet, rendering the third associated content to create a rendering of the third associated content in the first existing display area, wherein the rendering of the at least part of the primary content remains fully visible after the third associated content is rendered.

2. The method of claim 1, further comprising:

(7) after (6), receiving fourth user input selecting the second facet; and (8) in response to receiving the fourth user input and without receiving additional user input selecting the second term, rendering the fourth associated content to create a rendering of the fourth associated content in the first existing display area, wherein the rendering of the at least part of the primary content remains fully visible after the fourth associated content is rendered.

3. A first non-transitory computer-readable medium comprising computer-program instructions tangibly stored on the first non-transitory computer-readable medium, wherein the computer program instructions are executable by at least one computer processor to perform a method for use with primary content stored on a second computer-readable medium, wherein the primary content includes:

a first term, wherein the first term is associated with first associated content and second associated content, wherein the first associated content is associated with a first facet, and wherein the second associated content is associated with a second facet;

a second term, wherein the second term is associated with third associated content and fourth associated content, wherein the third associated content is associated with the first facet, and wherein the fourth associated content is associated with the second facet;

the method comprising:

(1) rendering at least part of the primary content to create a rendering of the at least part of the primary content, including rendering the first term to create a rendering of the first term and rendering the second term to create a rendering of the second term;

(2) receiving first user input selecting the first facet;

(3) receiving second user input selecting the first term;

(4) in response to receiving the second user input, rendering the first associated content to create a rendering of the first associated content in a first existing display area, wherein the rendering of the at least part of the primary content remains fully visible after the first associated content is rendered;

(5) receiving third user input selecting the second term; and (6) in response to receiving the third user input and without receiving additional input selecting the first facet, rendering the third associated content to create a rendering of the third associated content in the first existing display area, wherein the rendering of the at least part of the primary content remains fully visible after the third associated content is rendered.

4. The first non-transitory computer-readable medium of claim 3, wherein the method further comprises:

(7) after (6), receiving fourth user input selecting the second facet; and (8) in response to receiving the fourth user input and without receiving additional user input selecting the second term, rendering the fourth associated content to create a rendering of the fourth associated content in the first existing display area, wherein the rendering of the at least part of the primary content remains fully visible after the fourth associated content is rendered.

* * * * *